(12) United States Patent
Rees

(10) Patent No.: US 11,068,436 B2
(45) Date of Patent: Jul. 20, 2021

(54) LOG FILE MANAGEMENT

(71) Applicant: Carbonite, Inc., Boston, MA (US)

(72) Inventor: Mark Rees, London (GB)

(73) Assignee: CARBONITE, INC., Boston, MA (US)

(*) Notice: Subject to any disclaimer, the term of this patent is extended or adjusted under 35 U.S.C. 154(b) by 188 days.

(21) Appl. No.: 16/241,193

(22) Filed: Jan. 7, 2019

(65) Prior Publication Data

US 2019/0155786 A1     May 23, 2019

Related U.S. Application Data

(63) Continuation of application No. 12/749,420, filed on Mar. 29, 2010, now Pat. No. 10,210,162.

(51) Int. Cl.

| G06F 17/00 | (2019.01) |
|---|---|
| G06F 16/10 | (2019.01) |
| G06F 11/14 | (2006.01) |
| G06F 3/06 | (2006.01) |
| G06F 11/34 | (2006.01) |
| G06F 16/17 | (2019.01) |

(Continued)

(52) U.S. Cl.
CPC ............ *G06F 16/10* (2019.01); *G06F 3/0604* (2013.01); *G06F 3/067* (2013.01); *G06F 3/0608* (2013.01); *G06F 3/0611* (2013.01); *G06F 3/0631* (2013.01); *G06F 3/0638* (2013.01); *G06F 3/0643* (2013.01); *G06F 11/1435* (2013.01); *G06F 11/1451* (2013.01); *G06F 11/1461* (2013.01); *G06F 11/1464* (2013.01); *G06F 11/1469* (2013.01); *G06F 11/3476* (2013.01); *G06F 16/1727* (2019.01); *G06F 16/1744* (2019.01); *G06F 17/40* (2013.01); *G06F 2201/81* (2013.01)

(58) Field of Classification Search
None
See application file for complete search history.

(56) References Cited

U.S. PATENT DOCUMENTS

| 5,740,432 A | 4/1998 | Mastors |
|---|---|---|
| 5,999,949 A * | 12/1999 | Crandall ............. H03M 7/3088 341/51 |

(Continued)

OTHER PUBLICATIONS

U.S. Appl. No. 12/749,420, Office Action Communication dated Nov. 9, 2011, pp. 1-14.

(Continued)

*Primary Examiner* — Hasanul Mobin
(74) *Attorney, Agent, or Firm* — Sprinkle IP Law Group

(57) ABSTRACT

Methods, devices and computer program products facilitate the storage, access and management of log files that are associated with particular client devices. The log files provide a record of user or client device activities that are periodically sent to a data backup center. A dedicated log file server facilitates the processing and storage of an increasingly large number of log files that are generated by new and existing client devices. A storage server pre-processes the received log files to facilitate the processing and storage of the log files by the log file server. This Abstract is provided for the sole purpose of complying with the Abstract requirement rules. This Abstract is submitted with the explicit understanding that it will not be used to interpret or to limit the scope or the meaning of the claims.

17 Claims, 17 Drawing Sheets

(51) Int. Cl.
*G06F 16/174* (2019.01)
*G06F 17/40* (2006.01)

(56) References Cited

U.S. PATENT DOCUMENTS

| | | | |
|---|---|---|---|
| 6,023,710 A * | 2/2000 | Steiner | G06F 16/10 |
| 6,098,018 A * | 8/2000 | Welsh | G01S 13/95 |
| | | | 702/3 |
| 6,105,021 A | 8/2000 | Berstis | |
| 7,743,030 B1 | 6/2010 | Korolev et al. | |
| 8,671,097 B2 * | 3/2014 | Wu | H04L 63/1425 |
| | | | 707/736 |
| 8,924,352 B1 | 12/2014 | Andruss | G06F 11/1461 |
| | | | 707/640 |
| 2001/0033303 A1 * | 10/2001 | Anderson | G06T 3/0018 |
| | | | 715/854 |
| 2002/0138762 A1 | 9/2002 | Home | |
| 2002/0156965 A1 | 10/2002 | Gusler et al. | |
| 2002/0165911 A1 | 11/2002 | Gabber et al. | |
| 2003/0018619 A1 * | 1/2003 | Bae | G06F 11/3476 |
| 2003/0023340 A1 | 1/2003 | Kitamoto et al. | |
| 2003/0159088 A1 | 8/2003 | Phillips et al. | |
| 2005/0021950 A1 * | 1/2005 | Rothbarth | G06F 11/1464 |
| | | | 713/165 |
| 2005/0120111 A1 | 6/2005 | Bailey et al. | |
| 2005/0213511 A1 * | 9/2005 | Reece, Jr. | H04W 24/00 |
| | | | 370/252 |
| 2005/0246362 A1 | 11/2005 | Borland | |
| 2006/0004767 A1 | 1/2006 | Diaconu et al. | |
| 2006/0161593 A1 | 7/2006 | Mod et al. | |
| 2006/0212459 A1 * | 9/2006 | Sugimura | G06Q 30/02 |
| 2007/0011300 A1 | 1/2007 | Hollebeek et al. | |
| 2007/0083571 A1 | 4/2007 | Meller et al. | |
| 2007/0186068 A1 * | 8/2007 | Agrawal | G06F 11/1456 |
| | | | 711/162 |
| 2007/0226438 A1 | 9/2007 | Erofeev | |
| 2009/0083287 A1 * | 3/2009 | Bell | G06F 16/838 |
| 2009/0144283 A1 * | 6/2009 | Clark | G06F 16/10 |
| 2009/0164437 A1 * | 6/2009 | Torbjornsen | G06F 16/319 |
| 2009/0276470 A1 * | 11/2009 | Vijayarajan | G06F 16/10 |
| 2009/0288164 A1 * | 11/2009 | Adelstein | H04L 63/123 |
| | | | 726/22 |
| 2009/0307287 A1 | 12/2009 | Barsness et al. | |
| 2010/0070475 A1 * | 3/2010 | Chen | G06F 11/1451 |
| | | | 707/640 |
| 2010/0115443 A1 * | 5/2010 | Richstein | G06F 11/0706 |
| | | | 715/771 |
| 2010/0262585 A1 * | 10/2010 | Rosikiewicz | G06F 16/10 |
| | | | 707/679 |
| 2011/0029818 A1 | 2/2011 | Saito | |
| 2011/0185234 A1 | 7/2011 | Cohen et al. | |

OTHER PUBLICATIONS

U.S. Appl. No. 12/749,420, Office Action Communication dated May 7, 2012, pp. 1-18.
U.S. Appl. No. 12/749,420, Advisory Action dated Jul. 24, 2012, pp. 1-3.
U.S. Appl. No. 12/749,420, Office Action Communication dated Nov. 29, 2013, pp. 1-20.
U.S. Appl. No. 12/749,420, Office Action Communication dated Jun. 18, 2014, pp. 1-16.
U.S. Appl. No. 12/749,420, Office Action Communication dated Jan. 15, 2015, pp. 1-16.
U.S. Appl. No. 12/749,420, Office Action Communication dated Jul. 17, 2015, pp. 1-18.
U.S. Appl. No. 12/749,420, Office Action Communication dated Mar. 25, 2016, pp. 1-18.
U.S. Appl. No. 12/749,420, Office Action Communication dated Oct. 6, 2016, pp. 1-18.
U.S. Appl. No. 12/749,420, Office Action Communication dated May 4, 2017, pp. 1-21.
U.S. Appl. No. 12/749,420, Office Action Communication dated Feb. 7, 2018, pp. 1-25.
U.S. Appl. No. 12/749,420, Advisory Action dated Apr. 16, 2018, pp. 1-3.
U.S. Appl. No. 12/749,420, Office Action Communication dated Jun. 14, 2018, pp. 1-13.
U.S. Appl. No. 12/749,420, Notice of Allowance dated Nov. 16, 2018, pp. 1-11.

* cited by examiner

LOG FILE MANAGEMENT

FIELD OF THE INVENTION

The present invention relates generally to computer-based methods and apparatus, including computer program products, for managing user log files that are sent to data backup sites.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Computer systems are ubiquitous in today's work and home environments. The data stored on these computer systems, however, is vulnerable to theft, fire, flood, and other natural disasters. A data storage system is needed to support a backup and restore system for a large number of client computing devices. Multiple data centers may be employed to store user data backups. Such user data may include files that are generated or acquired by a user, such as video images, text or other information. In addition, other information and files, such as log files associated with a client computing device may also require backup. Such log files may, for example, hold information about various user or client device activities and are often periodically generated and sent to the data centers for backup.

As new client computing devices are subscribed to a data backup service and as the data associated with existing users of the data backup service continues to grow, the number of associated log files also increases. It, therefore, becomes more difficult to quickly and efficiently locate and manage the multitude of log files at a data center. Thus, a need exists to facilitate the storage, transfer and management of log files associated with a large number of client computing devices.

SUMMARY

One aspect of the disclosed embodiments relates to a method that includes aggregating a plurality of log files associated with a client device to produce an aggregated log file, where each of the plurality of log files corresponds to a record of activities associated with the client device. The method also includes setting a size limit associated with the aggregated log file, and transmitting the aggregated log file upon the aggregated log file reaching the size limit.

In one embodiment, the method further includes setting a time schedule associated with the aggregated log file. The method can also include filtering one or more of the plurality of log files, where the filtering includes excluding one or more log files from the aggregated log file. In one example, the exclusion of the log files is carried out if a size or a frequency of reception of the one or more of the log files exceeds predetermined thresholds. According to another embodiment, the method further includes transmitting a status file. The status file includes a description of data files associated with the client device, where the data files have been backed up at a data center. In still another embodiment, each of the plurality of log files corresponds to a record of the client device activities during a particular time period.

In another embodiment, the plurality of log files correspond to records of activities associated with a plurality of client devices, and an aggregated log file is generated for each of the plurality of client devices. In yet another embodiment, each of the plurality of log files is compressed.

Another aspect of the disclosed embodiments relates to a method that includes decompressing an aggregated log file, where the aggregated log file includes a plurality of compressed log files, and the plurality of compressed log files correspond to a record of activities associated with a client device. The method further includes appending the decompressed aggregated log file to a preexisting comprehensive log file to produce a comprehensive log file associated with the client device. In one embodiment, the preexisting comprehensive log file includes an uncompressed portion and a compressed portion, and the comprehensive log file is produced by appending the decompressed log file to the uncompressed portion of the preexisting comprehensive log file. In one example, upon reaching a particular size, the uncompressed portion of the comprehensive log file is compressed.

According to another embodiment, the method further includes accessing the comprehensive log file to extract a particular activity associated with the client device. In still another embodiment, the method further includes accessing the comprehensive log file to determine a cause and a timing of a problem associated with a client data. In one embodiment, the method further includes analyzing a plurality of comprehensive log files, and storing at least a portion of a comprehensive log file in a separate storage location in accordance with an age of the comprehensive log file. In another embodiment, the method further includes analyzing a plurality of comprehensive log files, and deleting one or more comprehensive log files that are associated with client devices with expired subscriptions.

Another aspect of the disclosed embodiments relates to a device that includes a processor and a memory that includes processor executable code. The processor executable code, when executed by the processor, configures the device to aggregate a plurality of log files associated with a client device to produce an aggregated log file, where each of the plurality of log files corresponding to a record of activities associated with the client device. The processor executable code, when executed by the processor, configures the device to set a size limit associated with the aggregated log file and transmit the aggregated log file upon the aggregated log file reaching the size limit. In one embodiment, the device is a storage server that is located at a data backup center.

Another aspect of the disclosed embodiments relates to another device that also includes a processor and a memory that includes processor executable code. The processor executable code, when executed by the processor, configures the device to decompress an aggregated log file, where the aggregated log file comprises a plurality of compressed log files. Further, the plurality of compressed log files correspond to a record of activities associated with a client device. The processor executable code, when executed by the processor, also configures the device to append the decompressed aggregated log file to a preexisting comprehensive log file to produce a comprehensive log file associated with the client device. In one embodiment, the device is a log file server that is located at a data backup center.

Another aspect of the disclosed embodiments relates to a computer program product that is embodied on a computer-readable medium. The computer program product includes program code for aggregating a plurality of log files associated with a client device to produce an aggregated log file, where each of the plurality of log files corresponds to a record of activities associated with the client device. The computer program product also includes program code for setting a size limit associated with the aggregated log file and program code for transmitting the aggregated log file upon the aggregated log file reaching the size limit.

Another aspect of the disclosed embodiments relates to another computer program product that is embodied on a computer-readable medium. The computer program product includes program code for decompressing an aggregated log file, where the aggregated log file comprises a plurality of compressed log files. Further, the plurality of compressed log files corresponds to a record of activities associated with a client device. The computer program product also includes program code for appending the decompressed aggregated log file to a preexisting comprehensive log file to produce a comprehensive log file associated with the client device.

Other aspects and advantages of the present invention will become apparent from the following detailed description, taken in conjunction with the accompanying drawings, illustrating the principles of the invention by way of example only.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration and do not necessarily depict the actual relative sizes or locations of the elements shown. The figures are provided for the purpose of illustrating one or more embodiments with the explicit understanding that they will not be used to limit the scope or the meaning of the claims.

DETAILED DESCRIPTION

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Figure 1:
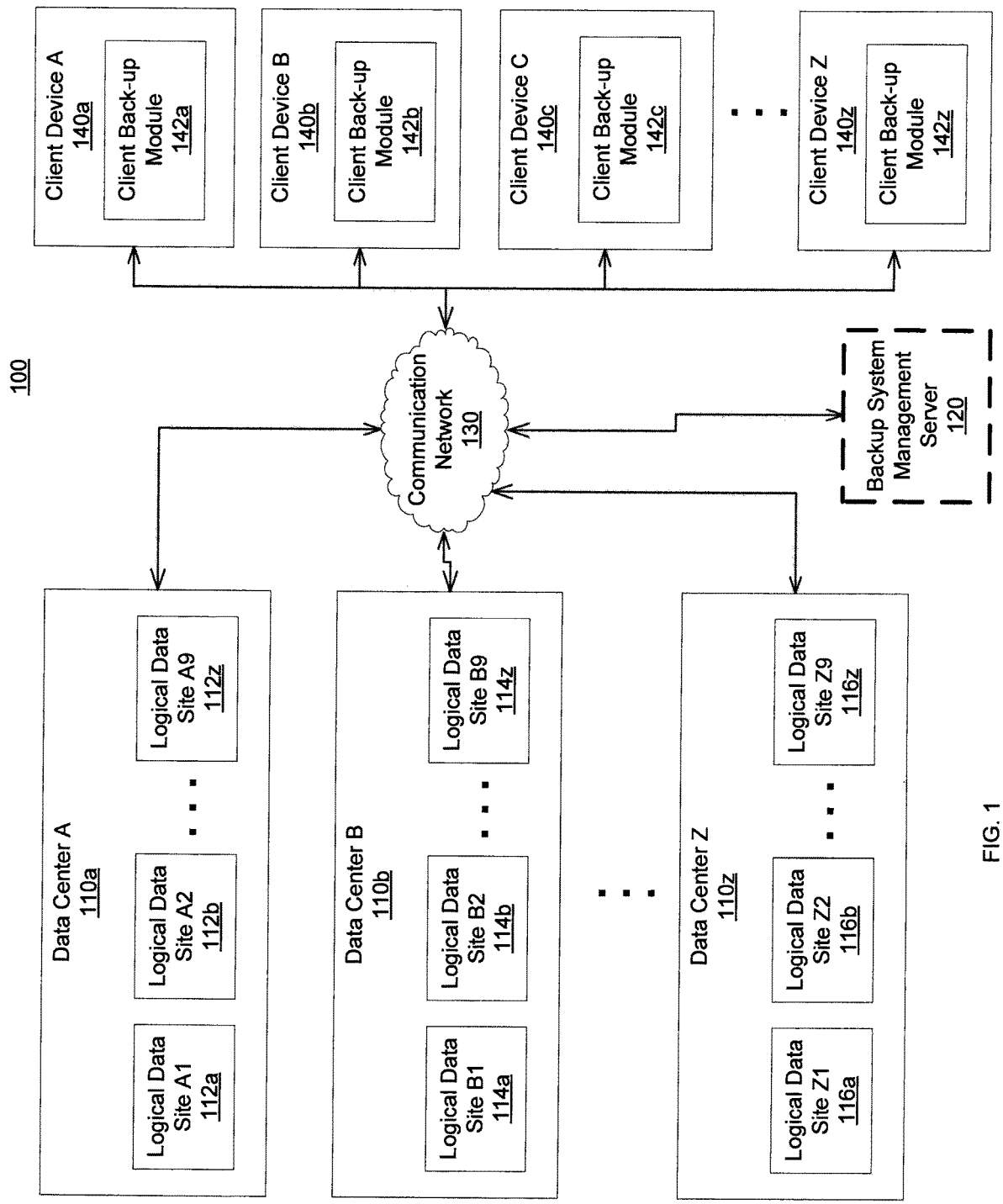
FIG. 1 is a block diagram illustrating an exemplary system, according to one exemplary embodiment.

FIG. 1 illustrates an exemplary system 100 for backup and restoration of user data (e.g., one or more document files, one or more audio files, etc.) between client devices A 140*a*, B 140*b*, C 140*c* through Z 140*z* (e.g., personal computer, server computing system, personal digital assistant, phone, music player, etc.) and data centers A 110*a*, B 110*b* through Z 110*z* (e.g., server systems with a plurality of data storage devices, server systems connected to a plurality of network data storage devices, etc.). The system 100 includes a communication network 130 (e.g., internet protocol (IP) network, a local area network (LAN), internet, etc.) and a backup system management server 120.

Each data center A 110*a*, B 110*b* through Z 110*z* includes a plurality of logical data sites 1, 2 through 9, 112*a*, 112*b* through 112*z*, 114*a*, 114*b* through 114*z*, and 116*a*, 116*b*, through 116*z*, respectively. Each client device A 140*a*, B 140*b*, C 140*c* through Z 140*z* includes a client backup module 142*a*, 142*b*, 142*c*, through 142*z*, respectively. The data centers 110*a*-110*z*, the client devices 140*a*-140*z*, and/or the backup system management server 120 communicate via the communication network 130.

The backup system management server 120 can manage the backup of user data from the client devices 140*a*-140*z* to one or more of the logical data sites at one or more of the data centers 110*a*-110*z*. The backup system management server 120 can manage the restoration of user data from one or more of the logical data sites at one or more of the data centers 110*a*-110*z* to the client devices 140*a*-140*z*. The backup system management server 120 can communicate with the client backup module 142*a*-142*z* on each client device 140*a*-140*z* to manage the backup and/or restoration of the user data (e.g., pause backup, start backup, select backup set, start restoration, schedule backup, communicate a backup policy, update a backup set, etc.).

In some examples, the restoration of the user data is to the originating client device (e.g., the client device from which the user data originated from, the client device connected to the computing device which the user data originated from, etc.). In other examples, the restoration of the user data is to another client device that is not the originating client device (e.g., new user computer, etc.).

In other examples, each data center 110*a*-110*z* includes a data center management server (not shown) for managing the backup and/or the restoration of the user data. In some examples, each logical site includes a site management server for managing the backup and/or the restoration of the user data. In other examples, the backup system management server 120 manages the backup and/or the restoration of the user data by managing one or more of the data center management servers and/or one or more of the site management servers.

Although FIG. 1 illustrates a single communication network 130, the system can include a plurality of communication networks and/or the plurality of communication networks can be configured in a plurality of ways (e.g., a plurality of interconnected local area networks (LAN), a plurality of interconnected wide area network (WAN), a plurality of interconnected LANs and/or WANs, etc.).

Although FIG. 1 illustrates the data centers A 110*a*, B 110*b* through Z 110*z*, the logical data sites 1, 2 through 9 (e.g. 112*a*-112*z*), and the client device A 140*a*, B 140*b*, C 140*c* through Z 140*z*, the system 100 can include any number of data centers, logical data sites, and/or client devices. In some examples, data centers A, B, and C include ten logical data sites and data centers D, E, F, and G include twenty logical data sites. In other examples, ten thousand client devices are associated with each logical data site. In this example, data center G is associated with two hundred thousand client devices since data center G includes twenty logical data sites and each logical data site is associated with ten thousand client devices.

Figure 2:
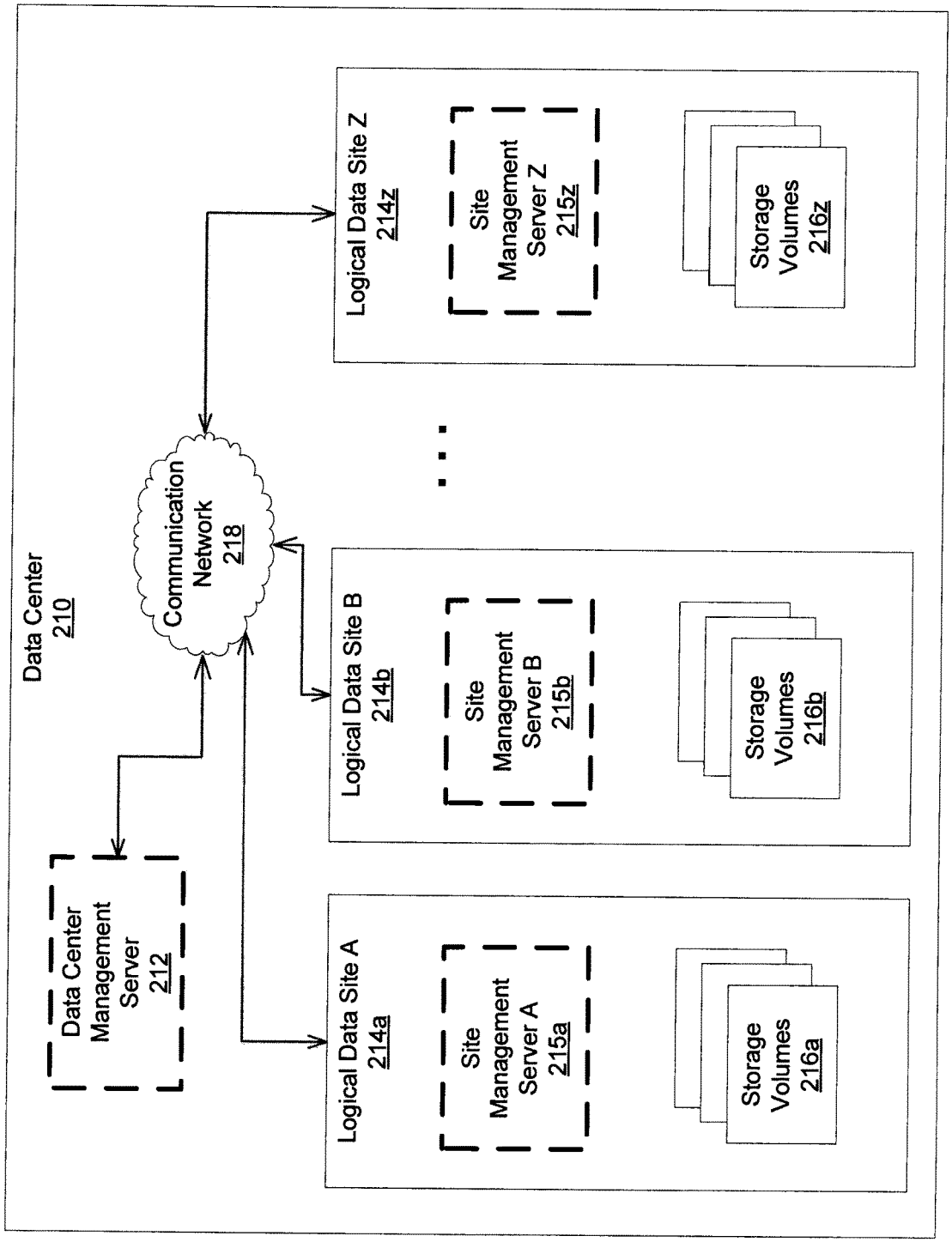
FIG. 2 is a block diagram illustrating an exemplary data center, according to one exemplary embodiment.

FIG. 2 illustrates an exemplary data center 210. The data center 210 includes a data center management server 212, logical data sites A 214*a*, B 214*b* through Z 214*z*, and a communication network 218. Each logical data site A 214*a*, B 214*b* through Z 214*z* includes a site management server A 215*a*, B 215*b* through Z 215*z* and one or more storage volumes 216*a*, 216*b* through 216*z* (e.g., logical storage volumes, storage devices, distributed storage devices, etc.). The data center management server 212 and/or the site manager servers 215*a*, 215*b* through 215*z* can manage the plurality of logical data sites 214*a*-214*z*.

Each logical data site A 214*a*, B 214*b* through Z 214*z* can store and/or retrieve the backup of user data associated with a plurality of users (e.g., subscribers to a backup subscription service, users in a corporate network, etc.). The storage volumes 216*a*-216*z* at each logical site 214*a*-214*z* can store and/or retrieve the backup of the user data.

In some examples, the backup of the user data is stored on a single storage volume (e.g., single storage device, single logical storage volume, redundant array of inexpensive disks (RAID) storage device, etc.). In other examples, the backup of the user data is stored on one or more storage volumes (e.g., distributed backup among a plurality of storage devices, redundant backup among a plurality of logical storage volumes, redundant backup among a plurality of RAID storage devices, etc.).

In some examples, the data center management server 212 manages the backup and/or the restoration for the data center 210 and the site manager server manages the storage and/or retrieval at the respective logical data site.

Although FIG. 2 illustrates a data center 210 with the logical data sites A 214*a*, B 214*b* through Z 214*z*, the data center 210 can include a single logical data site or any number of logical data sites (e.g., twenty, forty, one hundred, etc.). Although FIG. 2 illustrates the data center management server 212 and/or the site management server, the storage and/or retrieval of the backups of user data can be managed individually by either the data center management server 212 or the site management server at each respective logical site.

Figure 3A:
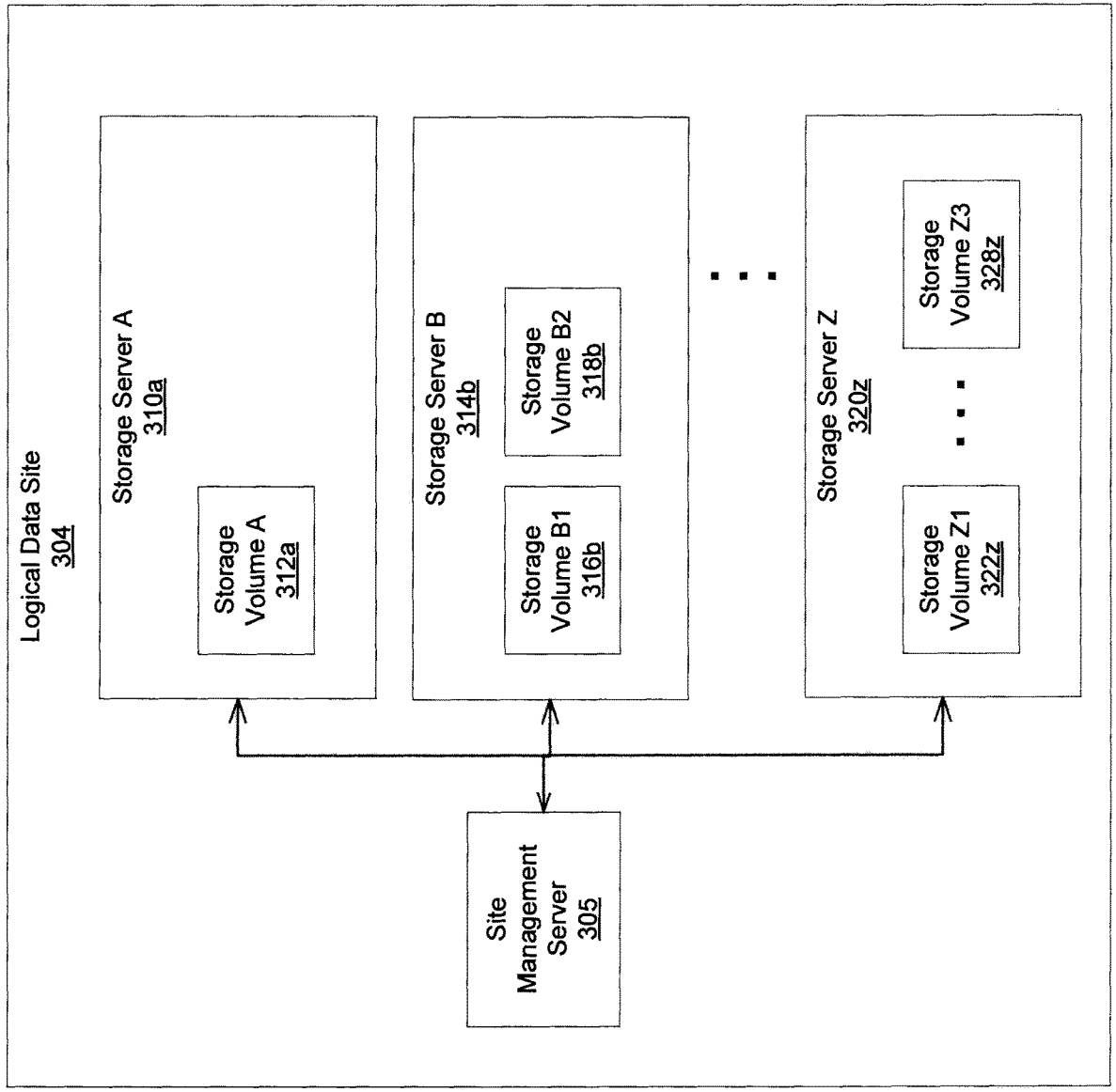
FIGS. 3A-3B are block diagrams illustrating exemplary logical data sites, according to one exemplary embodiment.

FIG. 3A illustrates a logical data site 304. The logical data site 304 includes a site management server 305 and storage server A 310*a*, B 314*b* through Z 320*z*. The storage server A 310*a* includes a storage volume A 312*a*. The storage server B 314*b* includes a storage volume B1 316*b* and a storage volume B2 318*b*. The storage server Z 320*z* includes a storage volumes Z1 322*z* through Z3 328*z*. Any number of storage volumes can be grouped within a storage server. Each storage volume includes a plurality of user data backup (not shown). The site management server 305 can communicate with the storage servers A 310*a*, B 314*b* through Z 320*z* to backup and/or restore the backup of the user data.

Although FIG. 3A illustrates storage servers A 310*a*, B 314*b* through Z 320*z* and storage volumes 312*a*, 316*b*, 318*b*, 322*z* through 328*z*, the logical data site 304 can include any number of storage servers and/or storage volumes. For example, the logical data site 304 can include four storage servers and each storage server includes forty storage volumes.

In some embodiments, the site management server 305 can include a database server and a server managing storage bandwidth resources for the logical data site 304. In these embodiments, the site management server 305 can control one or more communications servers that act as intermediary between client communication module 805 and the storage servers A 310*a*, B 314*b* through Z 320*z*.

Figure 3B:
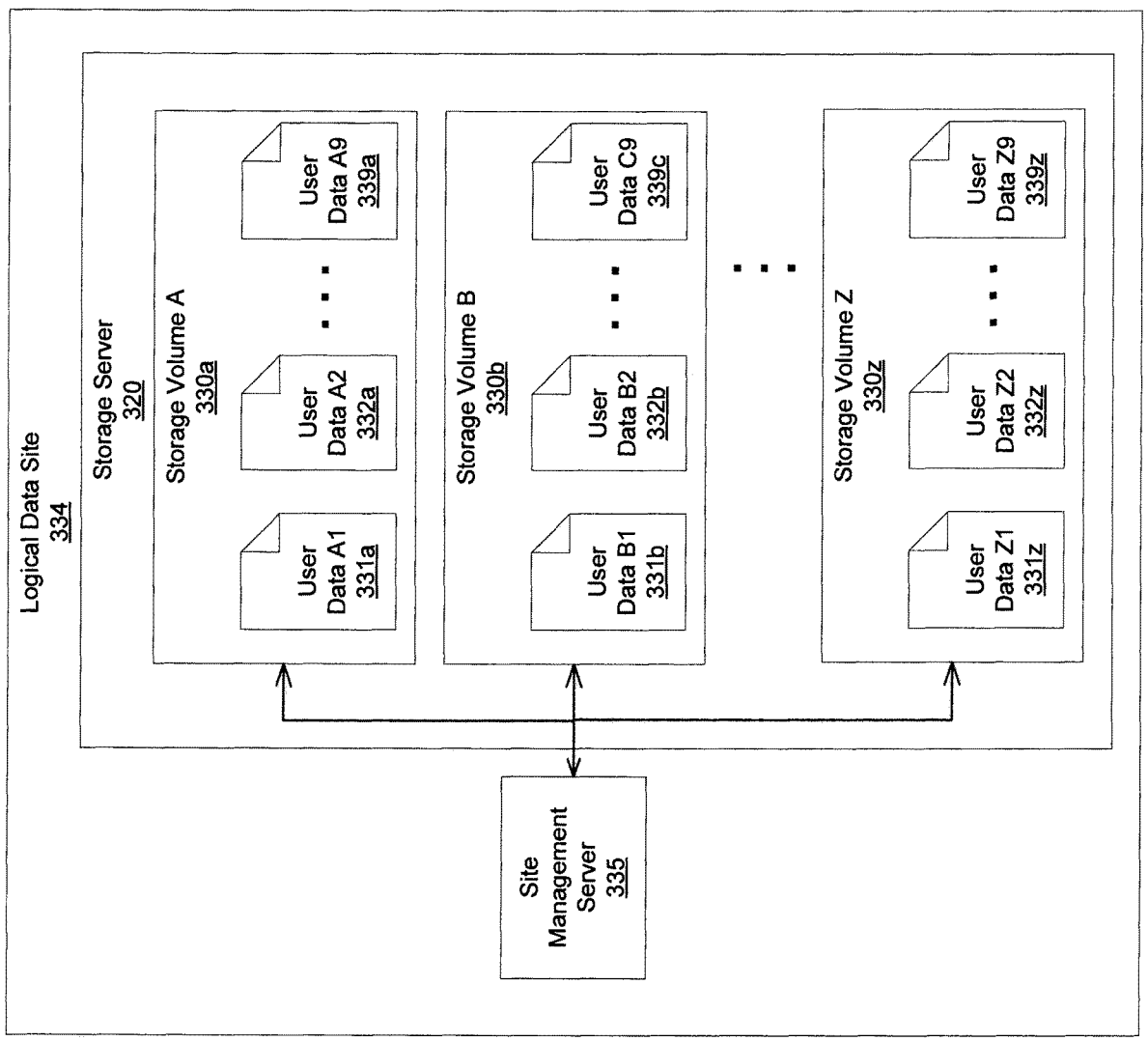

FIG. 3B illustrates a logical data site 334. The logical data site 334 includes a site management server 335 and a storage server 320. The storage server 320 includes storage volumes A 330*a*, B 330*b* through Z 330*z*. Each storage volume A 330*a*, B 330*b* through Z 330*z* includes plurality of user data 1, 2 through 9 (e.g., the user data is the backup of the user data stored on a client device associated with the user). The site management server 335 can communicate with the storage server 320 and/or the storage volumes A 330*a*, B 330*b* through Z 330*z* to backup and/or restore the backup of the user data.

In some examples, the site management server 335 can communicate with the storage volumes to transfer user data between the storage volumes. In some examples, the site management server 335 can communicate with one or more site management servers (not shown) at one or more other logical data sites (not shown) to transfer user data between the logical data sites.

Although FIG. 3B illustrates storage volumes A 330*a*, B 330*b* through Z 330*z* and user data 1, 2 through 9, the logical data site 334 can include any number of storage volumes and/or user data. For example, the logical data site 334 can include twenty storage volumes and each storage volume includes user data associated with one thousand users.

Figure 4:
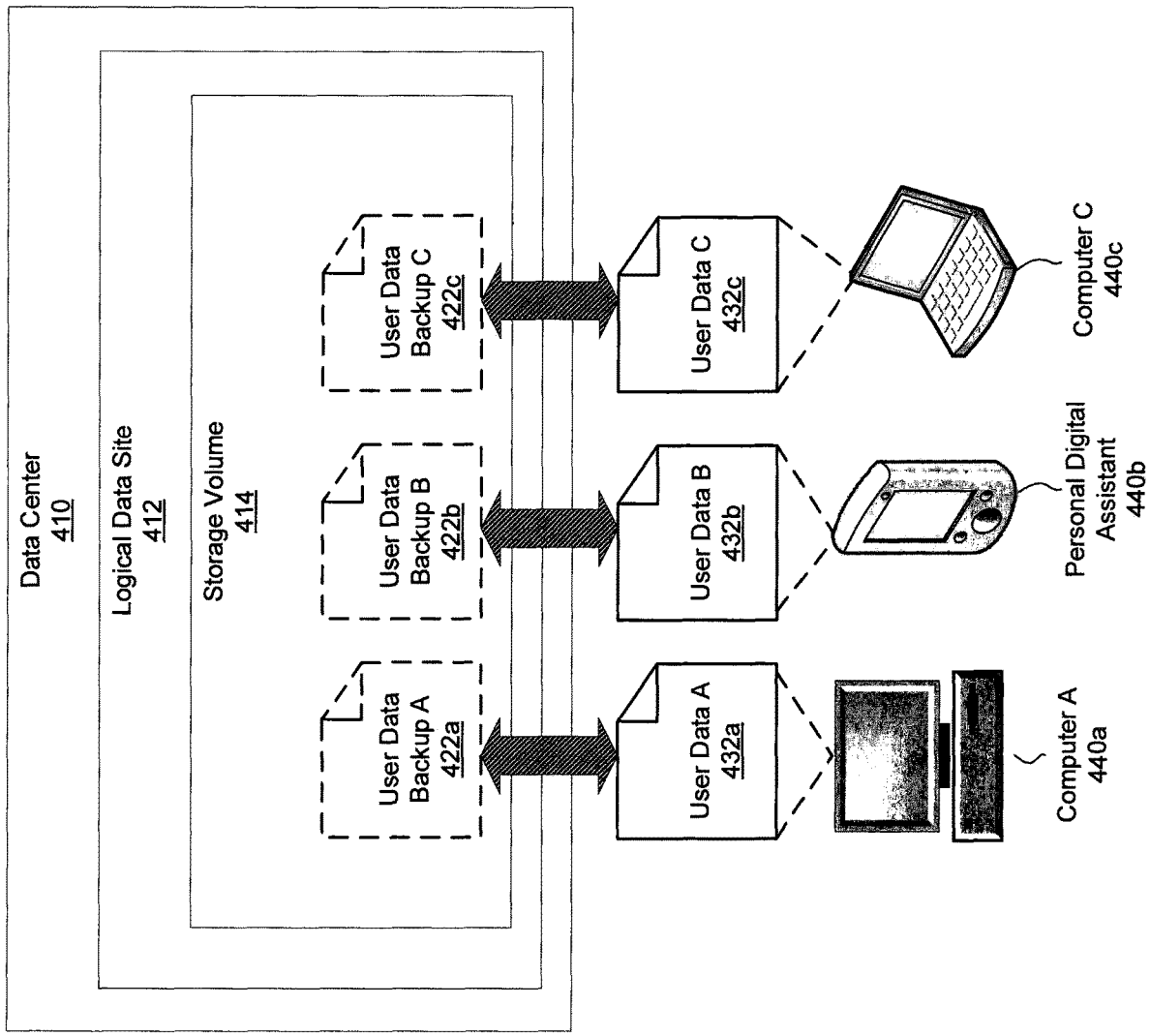
FIG. 4 is a block diagram illustrating an exemplary data center storing user data backup from client devices, according to one exemplary embodiment.

FIG. 4 illustrates an exemplary data center 410 for the backup of user data from one or more client devices 440*a*, 440*b*, and 440*c*. The data center 410 includes a logical data site 412. The logical data site 412 includes a storage volume 414. The storage volume 434 includes user data backups A 432*a*, B 432*b*, and C 432*c*. The user data backups A 422*a*, B 422*b*, and C 422*c* correspond to user data A 432*a*, B 432*b*, and C 432*c*, respectively. The user data A 432*a*, B 432*b*, and C 432*c* are stored on the client devices, computer A 440*a*, personal digital assistant 440*b*, and computer B 440*c*, respectively. As illustrated in FIG. 4, the user data A 432*a*, B 432*b*, and C 432*c* stored on the client devices is backed up to the storage volume 414 on the logical data site 412 in the data center 410.

Figure 5:
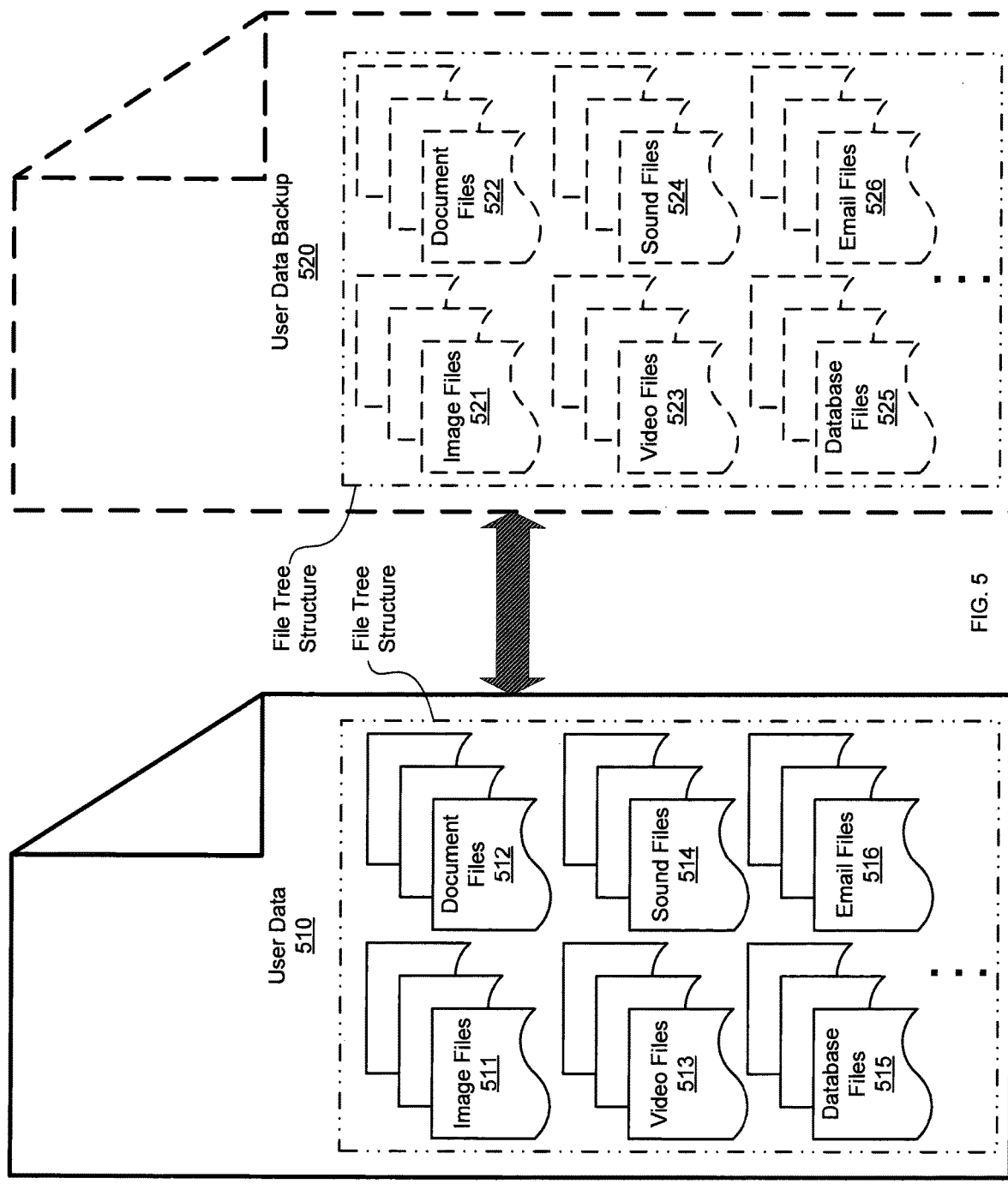
FIG. 5 illustrates exemplary user data and user data backup, according to one exemplary embodiment.

FIG. 5 illustrates exemplary user data 510 and user data backup 520. The user data 510 includes a plurality of files, image files 511, document files 512, video files 513, sound files 514, database files 515, and email files 516, and/or other information (e.g., registry information, user preference information, etc.) stored on a client device in a file tree structure (e.g., hierarchal database, hierarchal flat file, etc.). The user data backup 520 includes a plurality of files, image files 521, document files 522, video files 523, sound files 524, database files 525, and email files 526, and/or other information that is selected for backup by the user, automatically by the management server (e.g., site management server, data center management server, etc.), and/or based on backup templates and/or backup policies. The technology as described herein can be utilized to backup the user data as the user data backup.

Although FIG. 5 illustrates certain types of files (e.g., image files, document files, etc.), the technology as described herein can backup any type of information and/or data stored on the client device and/or a storage device connected to the client device (e.g., external storage device, network connected storage device, etc.).

Figure 6:
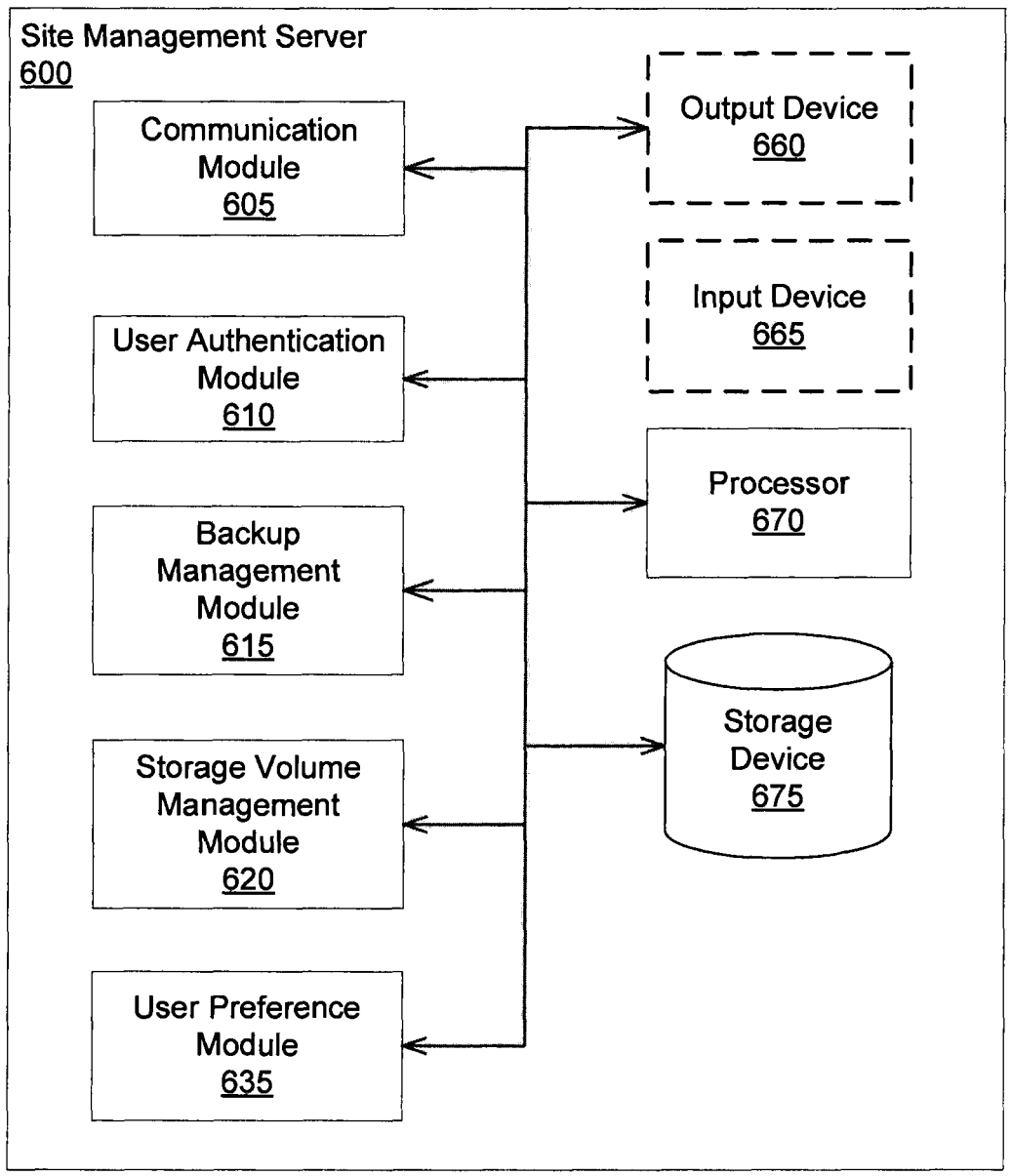
FIG. 6 is a block diagram illustrating an exemplary logical data site management server, according to one exemplary embodiment.

FIG. 6 illustrates an exemplary site management server 600. The site management server 600 includes a communication module 605, a user authentication module 610, a backup management module 615, a storage volume management module 620, a user preference module 635, an output device 660, an input device 665, a processor 670, and a storage device 675. The modules and/or devices can be hardware and/or software. The modules and/or devices illustrated in the site management server 600 can, for example, utilize the processor 670 to execute computer executable instructions and/or include a processor to execute computer executable instructions (e.g., an encryption processing unit, a field programmable gate array processing unit, etc.). It should be understood that the site management server 600 can include, for example, other modules, devices, and/or processors known in the art and/or varieties of the illustrated modules, devices, and/or processors. It should be understood that the modules and/or devices illustrated in the site management server 600 can be located within the site management server 600 and/or connected to the site management server 600 (e.g., directly, indirectly, etc.), but outside of the physical components of the management server (e.g., personal computer, mobile device, etc.).

The communication module 605 communicates data to/from the site management server 600. The user authentication module 610 authenticates users to the site management server 600. The backup management module 615 manages and/or controls backups to/from the site management server 600. The storage volume management module 620 manages user data storages on a storage volume, a logical data site and/or data center.

The output device 660 outputs information and/or data associated with the site management server 600 (e.g., information to a printer (not shown), information to a speaker, etc.). The input device 665 receives information associated with the site management server 600 (e.g., instructions from a user, instructions from a computing device, etc.) from a user (not shown) and/or a computing system (not shown). The input device 665 can include, for example, a keyboard, a scanner, an enrollment device, a scale, etc.

The processor 670 executes the operating system and/or any other computer executable instructions for the management server (e.g., executes applications, etc.). The site management server 600 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 675 stores the files, user preferences, backup sets, access information, an operating system and/or any other data or program code associated with the site management server 600. The storage device can include a plurality of storage devices. The storage device 675 can include, for example, long-term storage (e.g., a hard drive, a tape storage device, flash memory, etc.), short-term storage (e.g., a random access memory, a graphics memory, etc.), and/or any other type of computer readable storage.

Although FIG. 6 illustrates the exemplary site management server 600, any of the management servers described herein (e.g., data center management server) can include the components and functionality described with respect to the site management server 600.

Figure 7:
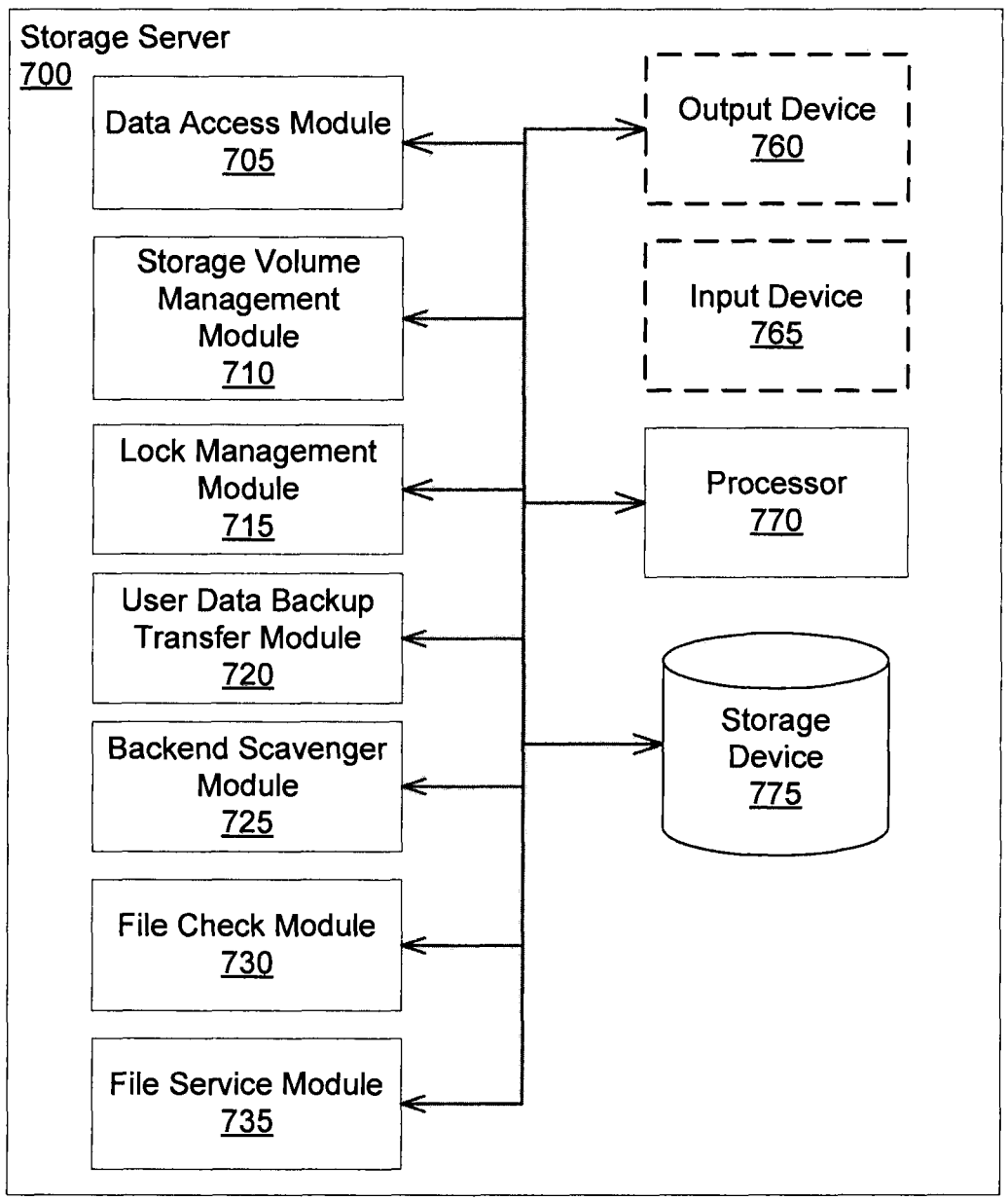
FIG. 7 is a block diagram illustrating an exemplary storage server, according to one exemplary embodiment.

FIG. 7 illustrates an exemplary storage server 700. The storage server 700 includes a data access module 705, a storage volume management module 710, a lock management module 715, a user data backup transfer module 720, a backend scavenger module 725, a file check module 730, a file service module 735, an output device 760, an input device 765, a processor 770, and a storage device 775. The modules and/or devices can be hardware and/or software. The modules and/or devices illustrated in the storage server 700 can, for example, utilize the processor 770 to execute computer executable instructions and/or include a processor to execute computer executable instructions (e.g., an encryption processing unit, a field programmable gate array processing unit, etc.). It should be understood that the storage server 700 can include, for example, other modules, devices, and/or processors known in the art and/or varieties of the illustrated modules, devices, and/or processors. It should be understood that the modules and/or devices illustrated in the storage server 700 can be located within the storage server 700 and/or connected to the storage server 700 (e.g., directly, indirectly, etc.), but outside of the physical components of the management server (e.g., personal computer, mobile device, etc.).

The data access module 705 accesses data stored on the storage server 700. The storage volume management module 710 manages user data storages on a storages volume, a logical data site and/or data center.

The lock management module 715 manages locks for locking user data during transfer of user data, maintenance, etc. In some embodiments, the lock management module 715 can manage different types of locks, including a copy lock protecting file copying, an exclusive lock protecting user data from any access to user data, a scavenger lock protecting for read and occasional deletion of expired or corrupt files, a lock protecting user data for reading and writing, a read lock protecting user data for reading, and/or any other type of computer locking mechanism. In some embodiments, the locks can be local to a storage volume, storage server, or logical data site, etc.

The user data backup transfer module 720 manages transfer of user data backup between logical data sites and/or data centers. In some embodiments, the user data backup transfer module 720 transfers user data backup from a source logical data site to a destination logical data site which are located in two different data centers.

The backend scavenger module 725 deletes files no longer required by client for backup. In some embodiments, the client device determines when to purge unwanted files, and updates the backup status files accordingly. Using the updated backup status files, the backend scavenger module 725 deletes files from storage volumes. The backend scavenger module 725 purges data for expired computers, deletes obsolete backup files, requests resend of missing files, performs server file integrity checks, aggregates client log files, aggregates client log files, gathers server file statistics to logs and database, and/or manages free space in the file system (e.g., NTFS, proprietary file system).

The file check module 730 deletes invalid files (e.g., expired files, suspended files, etc.). The file check module 730 verifies integrity of server files, gathers computer parameters from database, records activity to logs and database, and/or reads storage volume configurations from database, etc. In some embodiments, the file check module 730 moves invalid files to a predetermined folder on each storage volume, and the backend scavenger module 725 performs the actual deletion of the invalid files. In other embodiments, using a proprietary file system, the file check module 730 marks the invalid files for purging, and the file system internally manages the deletion of files marked for purging.

The file service module 735 receives log files and additional information that are associated with one or more client devices. The file service module 735 may also carry out certain processing operations on the incoming log files. For example, the file service module 735 may perform certain preliminary processing of the log files, aggregate the log files, and/or generate additional files or information related to the log files, client device and/or the backup data associated with the user device. The file service module 735 is also configured to transmit, and/or make available for transmission, the aggregated log files and other information to other modules within the data center. For example, the aggregated log files may be transmitted to a log file server (not shown).

The output device 760 outputs information and/or data associated with the storage server 700 (e.g., information to a printer (not shown), information to a speaker, etc.). The input device 765 receives information associated with the storage server 700 (e.g., instructions from a user, instructions from a computing device, etc.) from a user (not shown) and/or a computing system (not shown). The input device 765 can include, for example, a keyboard, a scanner, an enrollment device, a scale, etc.

The processor 770 executes the operating system and/or any other computer executable instructions for the management server (e.g., executes applications, etc.). The storage server 700 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 775 stores the files, user preferences, backup sets, access information, an operating system and/or any other data or program code associated with the storage server 700. The storage device can include a plurality of storage devices. The storage device 775 can include, for example, long-term storage (e.g., a hard drive, a tape storage device, flash memory, etc.), short-term storage (e.g., a random access memory, a graphics memory, etc.), and/or any other type of computer readable storage.

Although FIG. 7 illustrates the exemplary storage server 700, any of the management servers described herein (e.g., site management server) can include the components and functionality described with respect to the storage server 700.

Figure 8:
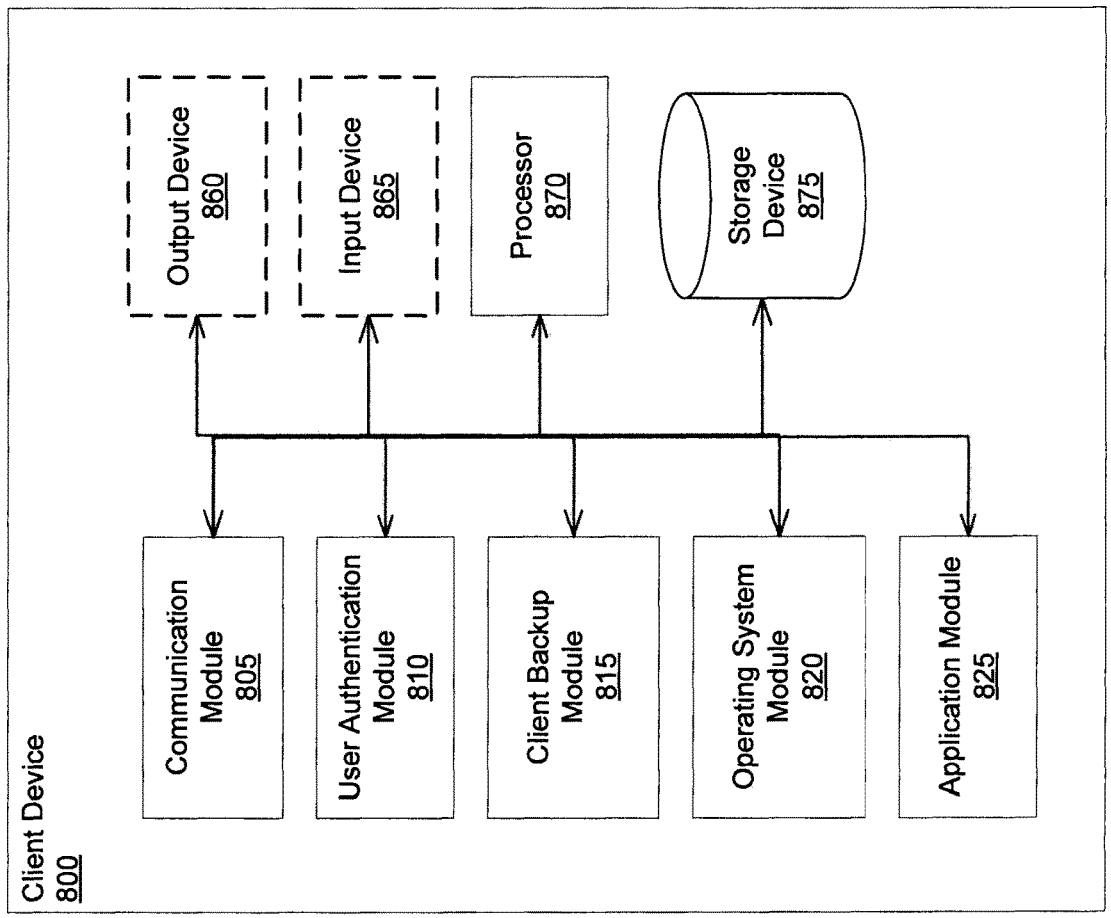
FIG. 8 is a block diagram illustrating an exemplary client device, according to one exemplary embodiment.

FIG. 8 illustrates an exemplary client device 800. The client device 800 includes a communication module 805, a user authentication module 810, a client backup module 815, an operating system module 820, an application module 825, an output device 860, an input device 865, a processor 870, and a storage device 875. The modules and/or devices can be hardware and/or software. The modules and/or devices illustrated in the client device can, for example, utilize the processor to execute computer executable instructions and/or include a processor to execute computer executable instructions (e.g., an encryption processing unit, a field programmable gate array processing unit, etc.). It should be understood that the client device 800 can include, for example, other modules, devices, and/or processors known in the art and/or varieties of the illustrated modules, devices, and/or processors. It should be understood that the modules and/or devices illustrated in the client device 800 can be located within the client device 800 and/or connected to the client device 800 (e.g., directly, indirectly, etc.), but outside of the physical components of the client device 800 (e.g., personal computer, mobile device, etc.).

The communication module 805 communicates data and/or information to/from the client device 800. The user authentication module 810 authenticates users for the client device 800 and/or the client backup module. The client backup module 815 backs-up, restores and/or identifies user data for backup and restoration. The operating system module 820 operates an operating system on the client device 800. The application module 825 operates one or more applications on the client device 800.

The output device 860 outputs information and/or data associated with the client device 800 (e.g., information to a printer (not shown), information to a speaker, etc.). The input device 865 receives information associated with the client device (e.g., instructions from a user, instructions from a computing device, etc.) from a user (not shown) and/or a computing system (not shown). The input device 865 can include, for example, a keyboard, a scanner, an enrollment device, a scale, etc.

The processor 870 executes the operating system and/or any other computer executable instructions for the client device (e.g., executes applications, etc.). The client device 800 can include random access memory (not shown). The random access memory can temporarily store the operating system, the instructions, and/or any other data associated with the client device. The random access memory can include one or more levels of memory storage (e.g., processor register, storage disk cache, main memory, etc.).

The storage device 875 stores the files, user preferences, backup sets, access information, an operating system and/or any other data or program code associated with the management server (e.g., site management server, data center management server, etc.). The storage device 875 can include a plurality of storage devices. The storage device 875 can include, for example, long-term storage (e.g., a hard drive, a tape storage device, flash memory, etc.), short-term storage (e.g., a random access memory, a graphics memory, etc.), and/or any other type of computer readable storage.

As noted earlier, log files associated with each client device may be periodically transmitted to a data center for backup storage. The log files may, for example, include information describing various user or client device activities. Such information may be continuously or periodically generated and sent to one or more data centers to be stored along with the user data associated with that client device. Log files are often transmitted as small pieces and appended together at the data center. The size of log files can vary significantly depending on the amount of activity on a client device and the frequency of log file generation/transmission. When appended together, in accordance with the disclosed embodiments, a comprehensive log file provides a complete history of various activities associated with a client device. Such information can facilitate the diagnoses of failures, as well as efficient repair and restoration of data to a user device. For example, the stored sequence of activities in a log file can help determine when and why a particular file was corrupted or deleted in a user device.

Figure 9:
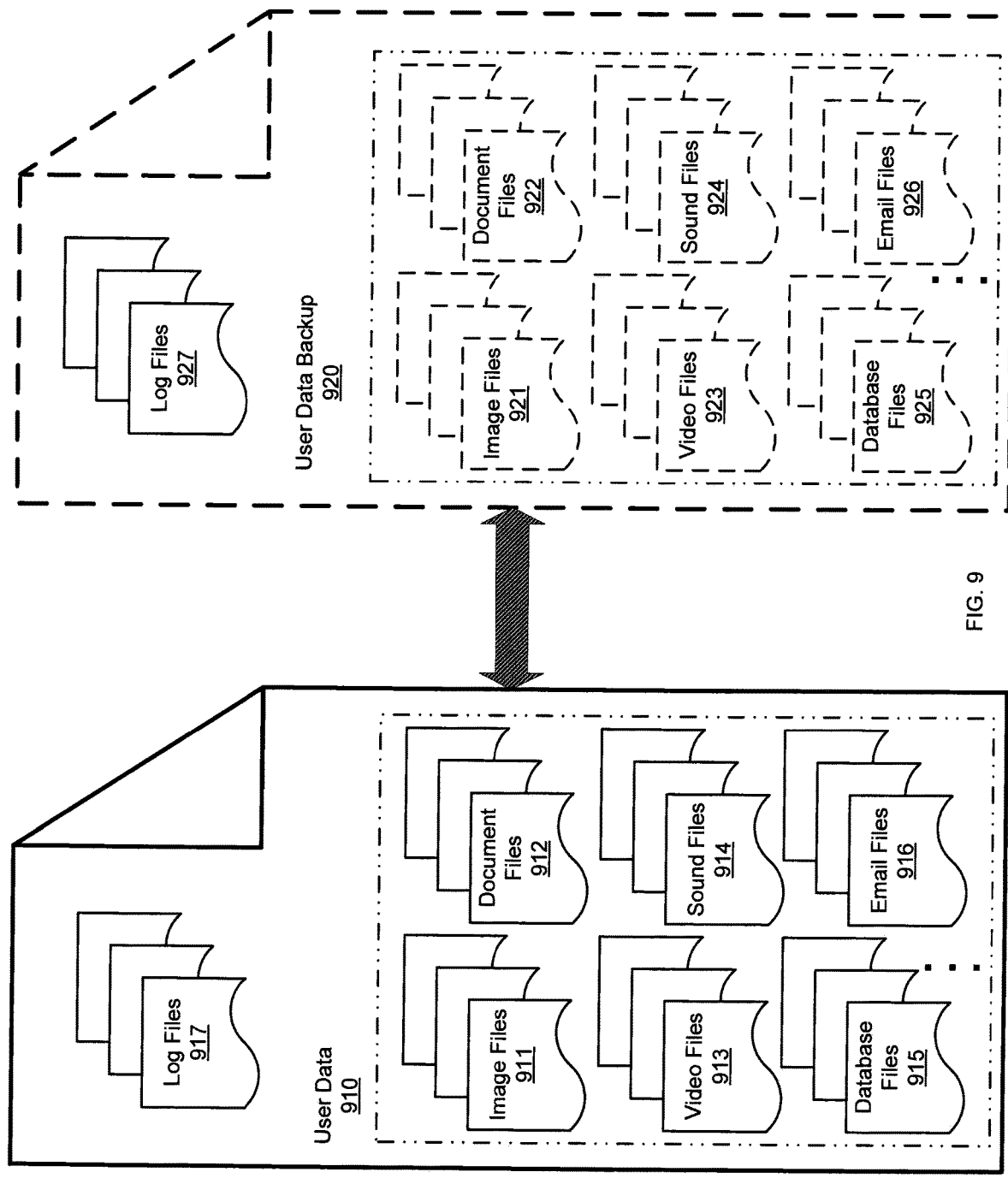
FIG. 9 illustrates exemplary log files, user data and user data backup, according to one exemplary embodiment.

FIG. 9 illustrates exemplary user data 910 and user data backup 920, in addition to log files 917 and 927 that are stored on a client device and at the backup storage site, respectively. The user data 910 includes a plurality of files, image files 911, document files 912, video files 913, sound files 914, database files 915, email files 916 and/or other information (e.g., registry information, user preference information, etc.) stored on a client device in a file tree structure (e.g., hierarchal database, hierarchal flat file, etc.). The user data backup 920 includes a plurality of files, including log files 927, image files 921, document files 922, video files 923, sound files 924, database files 925, and email files 926, and/or other information that is selected for backup by the user, automatically by the management server (e.g., site management server, data center management server, etc.), and/or based on backup templates and/or backup policies. Each log file may represent a recorded log of user/user device activity for a particular duration of time or a particular number/volume of activity. For example, a log file may be transmitted to a data center every hour, upon the completion of fifty user/user device activities and/or upon the log file size reaching a fixed number of bytes (e.g., 8 kbytes). It should be noted that the format of one or more files associated with the user data backup 920 in FIG. 9 may be different from the corresponding file that is associated with user data 910. In particular, the log files 917 associated with user data 910 may be in a compressed format while the log files 927 associated with user data backup 920 may be in a partially or fully uncompressed format.

As time goes on, the number of log files corresponding to existing client devices continues to grow at the associated data center(s). In addition, newly subscribed client devices further increase the number log files at the data center. Each client device can produce a large number of log files (e.g., one log file every hour) that may be stored on a storage volume. Such an increase in the number and size of log files necessitates more storage capacity and additional computational capabilities for managing the log files. As noted in connection with FIGS. 2 and 3, a data center can include a large number of servers and storage volumes. For example, each logical site may include hundreds of logical data sites, and each logical data site may include a number of storage servers and storage volumes that contain backup data corresponding to a large number of client devices. Having a large number of independent log files that are spread over hundreds of servers and storage devices makes it difficult to access the log files associated with a particular device to track the cause and timing of certain errors and/or to look for commonality of events that has occurred on different client devices. Further, the storage and management of the scattered log files can impede the data center's main operations that relate to the backup and restoration of user data. In addition, the scattered log files diminish the data center's storage capacity that is needed for backup of user data.

The disclosed embodiments facilitate the management and storage of the log files. In one example embodiment, a log file server is primarily responsible for managing the log files associated with various client devices. According to the disclosed embodiments, the log file server receives one or more log files that have been previously pre-processed by a storage server. The log file server then processes the log files and produces a comprehensive log file that is associated with a particular user device. The comprehensive log files are stored in the storage volume associated with log file server. In one example, the comprehensive log files are further analyzed and may be relocated to a different volume.

Figure 10:
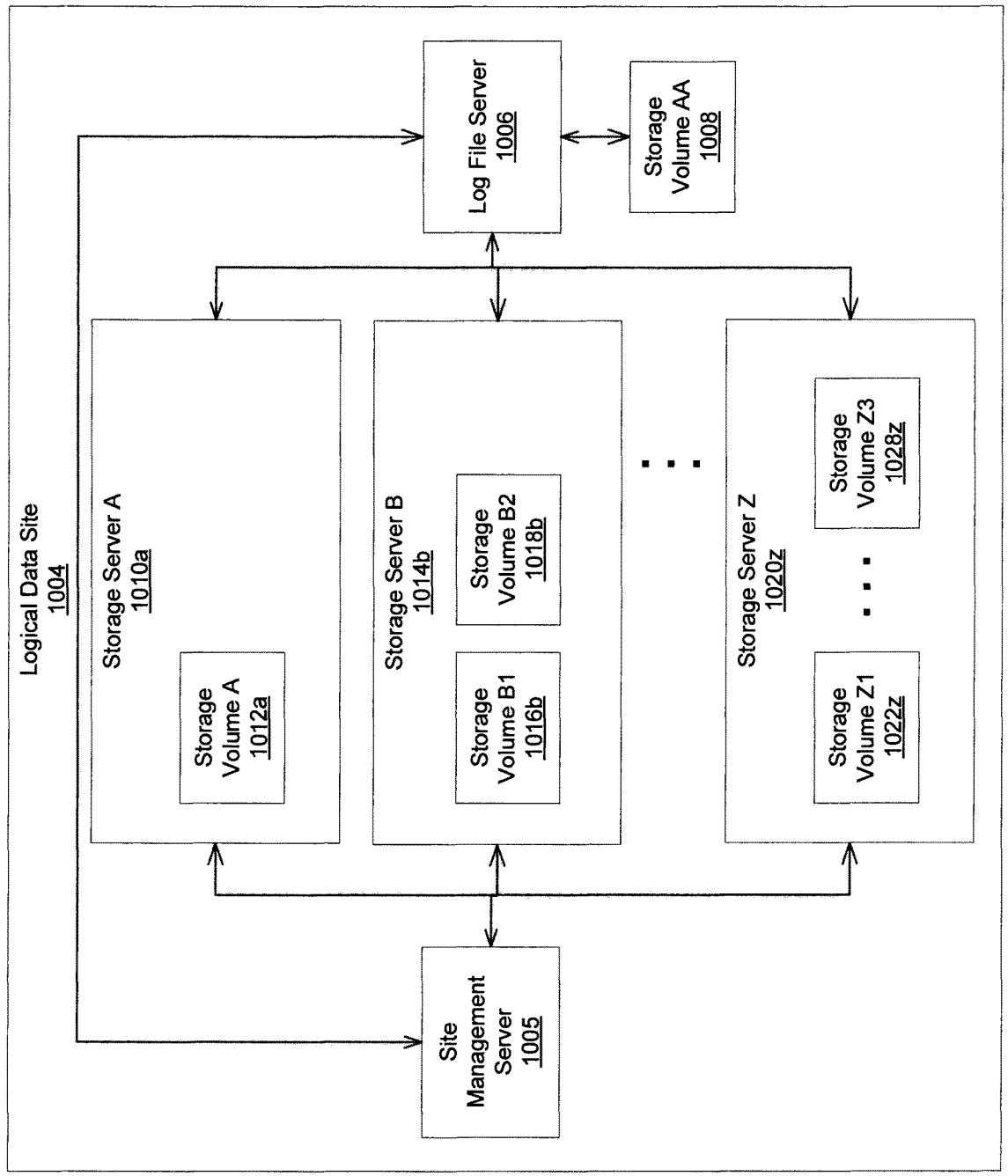
FIG. 10 is a block diagram illustrating an exemplary logical data site with a log file server, according to one exemplary embodiment.

FIG. 10 is a block diagram illustrating an exemplary log file server 1006 associated with a logical data site 1004. The logical data site 1004 includes a site management server 1005 and storage servers A 1010a, B 1014b through Z 1020z. Storage server A 1010a includes a storage volume A 1012a. Storage server B 1014b includes a storage volume B1 1016b and a storage volume B2 1018b. Storage server Z 1020z includes a storage volumes Z1 1022z through Z3 1028z. Any number of storage volumes can be grouped within a storage server. Each storage volume includes a plurality of user data backup (not shown). The site management server 1005 can communicate with storage servers A 1010a, B 1014b through Z 1020z to backup and/or restore the user data. FIG. 10 also illustrates a log file server 1006 that is in communication with storage servers A 1010a and B 1014b through Z 1020z. The log file server 1006 is also in communication with the site management server 1005. The log file server 1006 is also connected to one or more storage volumes, such as storage volume AA 1008, which can be used to store the log files, as well as some or all of the additional information that transmitted by the storage servers A 1010a and B 1014b through Z 1020z and/or the site management server 1005. Storage volume AA 1008 can also store computer code that, when executed by a processor, configures the log file server to carry out the various operations in accordance with the disclosed embodiments. It should be noted that the log server 1006 may also be connected to additional storage volumes (not shown).

Although FIG. 10 illustrates a single log file server 1006, additional log file servers may be implemented pursuant to the disclosed embodiments. For example, each of the storage servers A 1010a, B 1014b through Z 1020z, may be in communication with a separate log file server that is configured to manage only the log files with that storage server.

Figure 11:
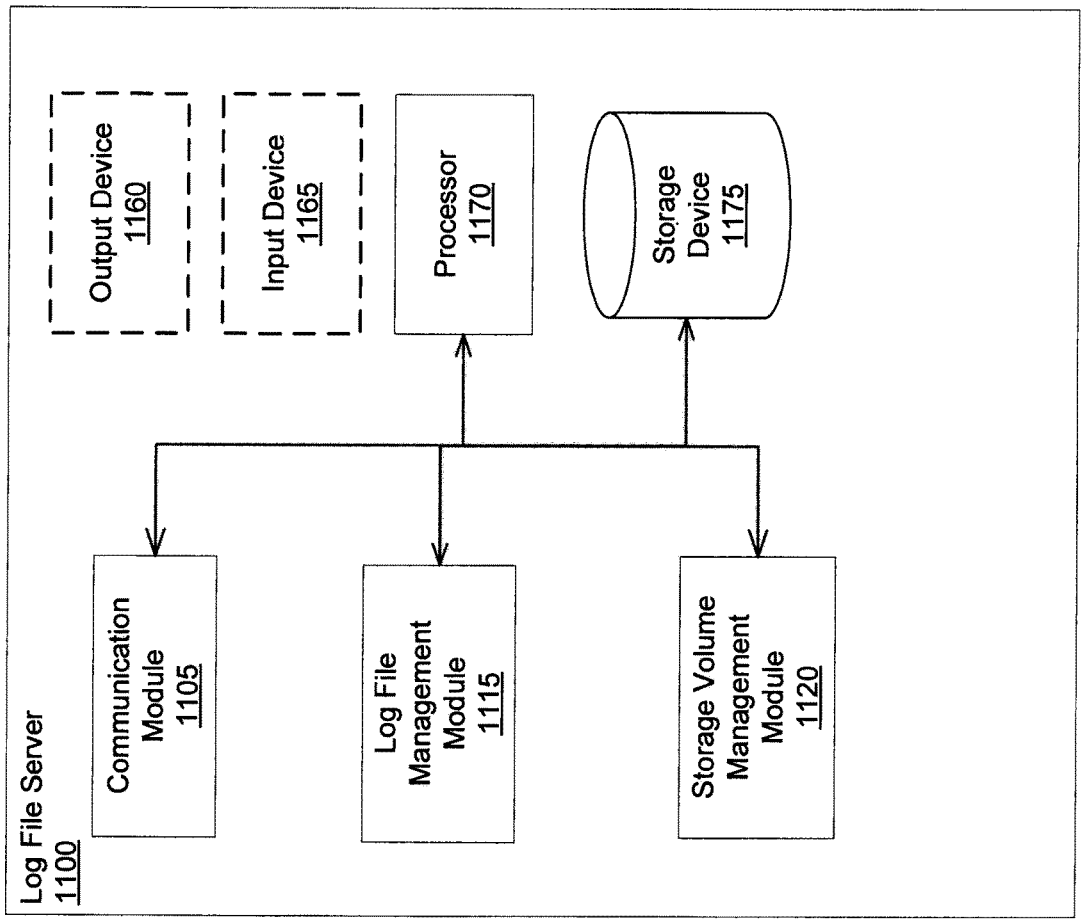
FIG. 11 is a block diagram illustrating an exemplary log file server, according to one exemplary embodiment.

FIG. 11 illustrates an exemplary log file server 1100 in accordance with the disclosed embodiments. The log file server 1100 includes a communication module 1105, a log file management module 1115, an output device 1160, an input device 1165, a processor 1170, and a storage device 1175. The modules and/or devices can be hardware and/or software. The modules and/or devices illustrated in the site management server 1100 can, for example, utilize the processor 1170 to execute computer executable instructions and/or include a processor to execute computer executable instructions (e.g., an encryption processing unit, a field programmable gate array processing unit, etc.). It should be understood that the log file server 1100 can include, for example, other modules, devices, and/or processors known in the art and/or varieties of the illustrated modules, devices, and/or processors. It should also be noted that the log file server 1100 may contain fewer modules than depicted in FIG. 11. It should be understood that the modules and/or devices illustrated in the log file server 1100 can be located within the log file server 1100 and/or connected to the log file server 1100 (e.g., directly, indirectly, etc.), but outside of the physical components of the management server (e.g., personal computer, mobile device, etc.).

The communication module 1105 communicates data or commands to/from the log file server 1100. For example, the communication module 1105 can receive log files, log file fragments and/or other files or commands from a storage server and can transmit log files (in compressed format, uncompressed format, or a combination thereof) to another server or to a storage volume. The storage volume management module 1120 manages data storage on a storages volume, a logical data site and/or data center.

The output device 1160 outputs information and/or data associated with the site management server 1100 (e.g., information to a printer (not shown), information to a speaker, etc.). The input device 1165 receives information associated with the site management server 1100 (e.g., instructions from a user, instructions from a computing device, etc.) from a user (not shown) and/or a computing system (not shown). The input device 1165 can include, for example, a keyboard, a scanner, an enrollment device, a scale, etc.

The processor 1170 executes the operating system and/or any other computer executable instructions for the management server (e.g., executes applications, etc.). The log file server 1100 can include random access memory (not shown). The random access memory can temporarily store the operating system, the instructions, and/or any other data associated with the management server. The random access memory can include one or more levels of memory storage (e.g., processor register, storage disk cache, main memory, etc.).

Figure 12:
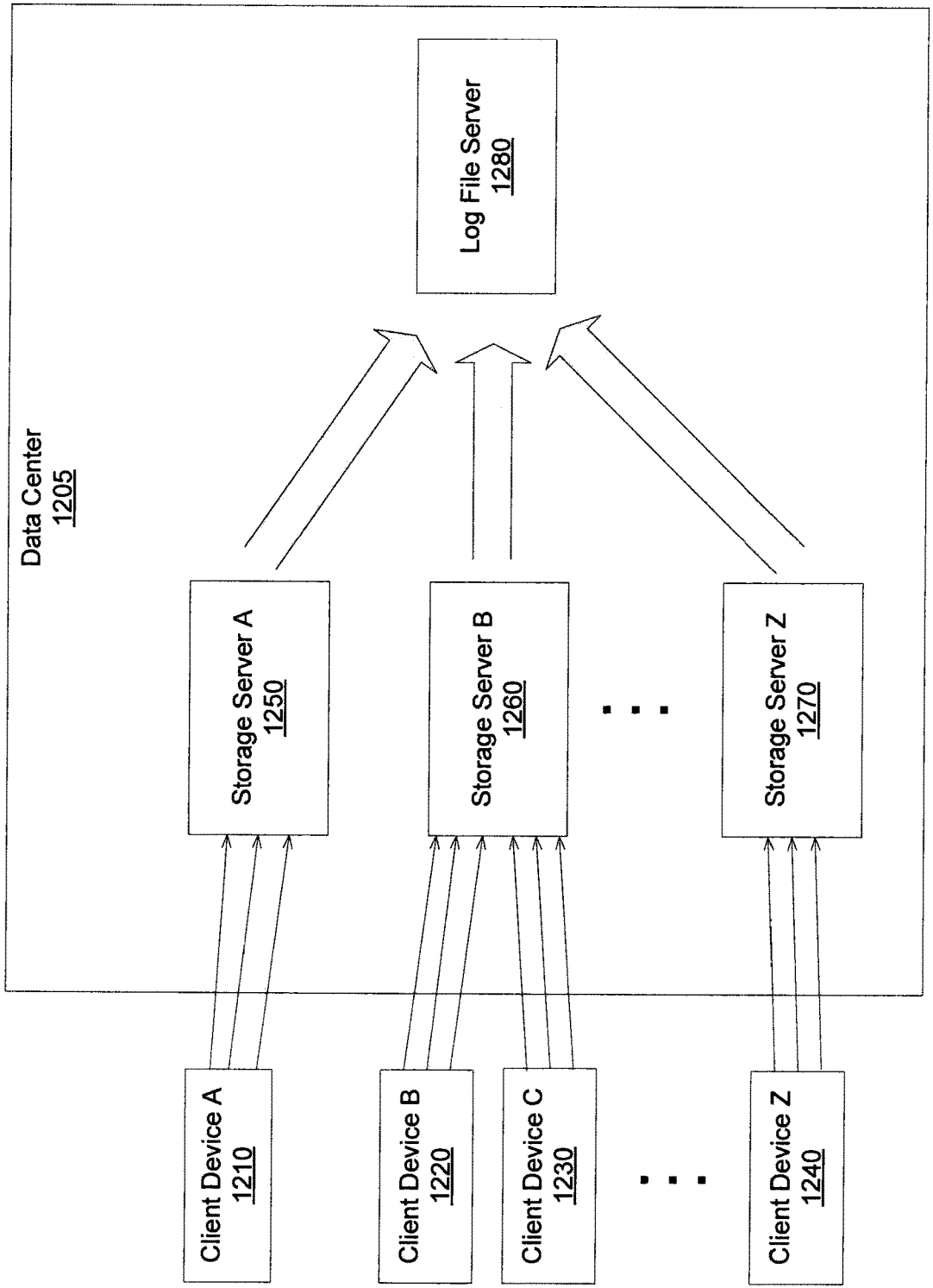
FIG. 12 is a block diagram illustrating an exemplary data center with storage servers and a log file server, according to one exemplary embodiment.

FIG. 12 is a block diagram illustrating a log file server 1280 that resides in a data center 1205 in accordance with an example embodiment. FIG. 12 illustrates a plurality of client devices, including client device A 1210, client device B 1220, client device C 1230 and client device Z 1240. FIG. 12 also illustrates a plurality of storage servers, including storage server A 1250, storage server B 1260 and storage server Z 1270. Each storage server is configured to receive log files and other information from one more client devices. It should be understood that FIG. 12 have been simplified in order to facilitate the description of the disclosed embodiments. In particular, data center 1205 may comprise additional components and modules, such as communication networks, management and maintenance servers, logical data sites and storage volumes. It should also be noted that additional or fewer storage servers, client devices and/or log file servers may be used. Further, the storage servers A 1250 and B 1260 through Z 1270 are configured to receive, directly or indirectly, backup data, log files and other information from the user devices A 1210, B 1220 and C 1230 through D 1240. For example, such data, log files and other information may be received through one or more communication networks and links under the control of a backup management server, data center management server and/or a site management server. These communication networks and links may include a secure network or link. For example, the log files, data to be backed up and other information may be transmitted over a secure connection using secure socket layer (SSL).

Referring back to FIG. 12, a user device, such as user device A 1210, is configured to transmit the log files to the data center 1205. The log files include information describing various user or client device activities that are periodically generated and sent to the data center 1205 to be stored along with the user data associated with a client device. In one example, the log files are transmitted to the data center 1205 every hour. In another example, the log files are transmitted upon the completion of fifty user/user device activities. In a further example, the log files are transmitted upon the log file size reaching a fixed number of bytes (e.g., 8 kbytes). It is also possible to transmit the log files upon reaching any of the above-described example conditions. Therefore, the size and contents of log files that are received at the data center 1250 can vary significantly depending on the amount of user activity and the particular condition(s) used for triggering the transmission of log files.

In one embodiment, the log files that are received by storage servers A 1250 and B 1260 through Z 1270 are encrypted. In another embodiment, the log files that are received by storage servers A 1250 and B 1260 through Z 1270 are compressed. Storage servers A 1250 and B 1260 through Z 1270 can analyze and aggregate the received log files before transmitting the aggregated log files to the log file server 1280. These and other operations related to the management and analysis of log files may be carried out by a File Service module 735 that is illustrated in FIG. 7.

Figure 13:
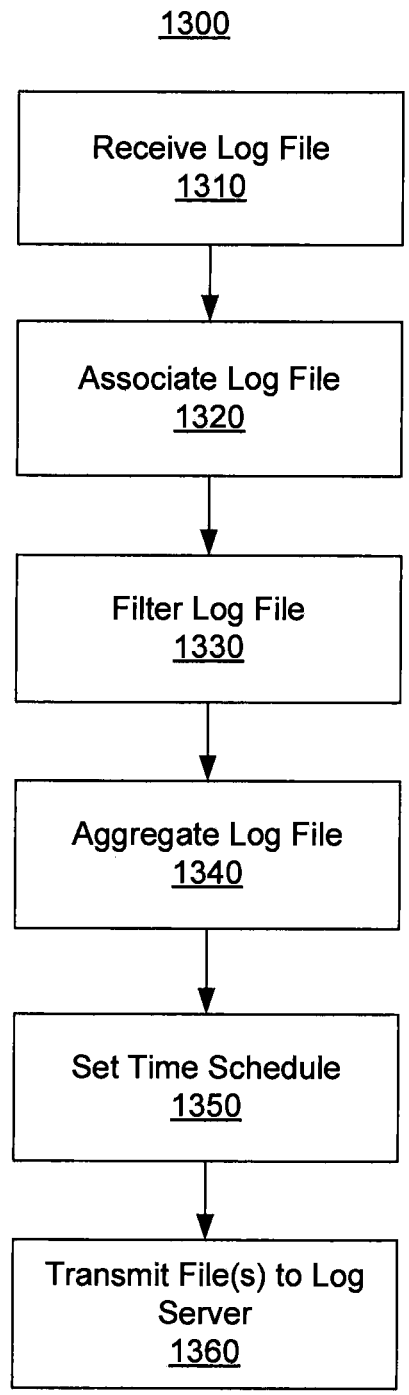
FIG. 13 is a flowchart illustrating some of the operations carried out at a storage server, according to one exemplary embodiment.

FIG. 13 is a flow diagram 1300 describing the operations that may be carried out by a file service module 735 of a storage server in accordance with the disclosed embodiments. In step 1310 the log files and other information are received. In step 1340, the log files are aggregated. The aggregation may be carried out according to a file size quota. In particular, a number of log files may be collected and aggregated until the aggregated file size reaches a particular quota. For example, a file size quota may be set to 1 Mega Bytes. In step 1360, the aggregated log file is transmitted to the log file server. The transmission may occur over a communication network that includes a secure link. The transmission can occur according to a transmission schedule (e.g., at particular time) or can be triggered based on an aggregated log file size. Additionally, or alternatively, the log file server may be periodically polled by one or more storage servers to collect the log files. The file service module 735 may also transfer additional files to the log file server. In particular, a status file that is generated during the course of data backup may be transmitted along with the aggregated log files to the log file server. These status files are small databases of information which define all the files that are in the backup data associated with a particular client device. Such information is typically stored along with the backup data. However, the status files may also be transmitted to the log file server in conjunction with the aggregated log files. This way, the status files are redundantly stored in two locations. In addition, they can be readily located and accessed along with the comprehensive log files that are generated by the log file servers. The transmission of status files may also be subject to certain quota or limitations. For example, the status files may be subject to a daily count quota. The comprehensive log files and the corresponding status files can be used to conduct various statistical analysis of the user data.

FIG. 13 also illustrates additional operations that may be carried out by a storage server (e.g., by a File Service module 735 associated with the storage server) in accordance with other embodiments. For example, in step 1320, the log files are associated with particular client devices. To this end, the log file is analyzed, prior to aggregation, to determine its association with a particular client device. For example, a log file may be analyzed and associated with a particular client device ID. In another embodiment, in step 1330, the log files are filtered prior to aggregation. In particular, a client device may transmit large amounts of log file data due to, for example, a device malfunction or a software bug. In such scenarios, some or all of the received log files may be filtered out. According to another embodiment, in step 1350, a time schedule is set for transmission of aggregated log files to the log file server. For example, the aggregated log files may be sent twice a day at 12:00 am and 12:00 pm, respectively. The above-described pre-processing operations (i.e., Filtering (step 1330), aggregation (step 1340) and time schedule implementation (step 1350)) enable the file service module 735 to flexibly and efficiently manage the incoming log files and prepare them for subsequent processing by the log file server. For example, an aggregated log file may be sent at least once per day, unless the aggregated log file size exceeds 1 Mega Bytes, in which case, up to three aggregated log files may be sent to the log file server. The file service module 735 may also dynamically modify the pre-processing thresholds to obtain a desired performance target. For example, during a particularly busy period, the file service module 735 log file may modify the transmission schedule of the previous example to transmit an aggregated log file only once per day.

Figure 14:
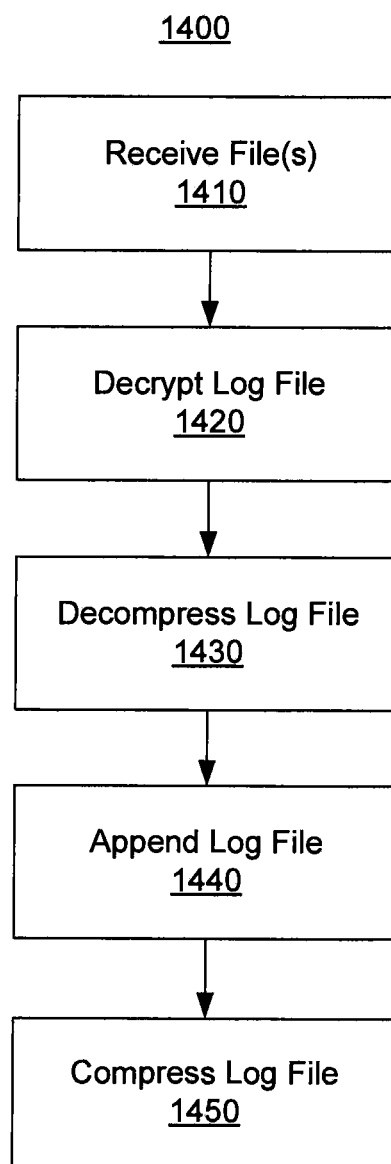
FIG. 14 is a flowchart illustrating some of the operations carried out at a log file server, according to one exemplary embodiment.

FIG. 14 illustrates is a flow diagram 1400 describing the operations that may be carried out by a log file server in accordance with the disclosed embodiments. These operations may be conducted by a log file management module 1120 that resides at the log file server, as depicted in FIG. 11. In step 1410, the aggregated log files, the status files and other information are received at the log file server. As noted earlier, the received log files may be encrypted and/or compressed. In step 1420, the aggregated log file is decrypted. The decryption operation can include decrypting the individual log files (or log file segments) that make up the aggregated log file. Additionally, or alternatively, the decryption operation can comprise decrypting the aggregated log file as a single file. The aggregated log file may have been encrypted by, for example, the storage server prior to the transmission of the aggregated log file. In step 1330, the decrypted log files are decompressed. It should be noted that while the decryption (step 1420) and decompression (step 1430) operations are carried out when the aggregated log files are both encrypted and compressed, one or both of these operations may be carried out external to the log file server, and/or skipped if the received files are not encrypted or compressed. For example, the encryption/decryption of the log files may be not be needed, or may be transparently conducted by other applications/components. Further, if the size of an aggregated log file is small, compression of the log file may not be necessary.

Further, the decryption (step 1420) or decompression (step 1430) operations may sometimes fail to be successfully carried out. For example, a received log file may be corrupted. In such scenarios, the log file management module 1120 can be configured to produce an error message to signal such failures. Such an error message may be appended to incorporated into the log files. Additionally, or alternatively, a failure to decrypt or decompress may trigger a request to the storage server for re-transmission of the corrupted log file. In step 1440, the decompressed log files are appended to the existing log files that correspond to a particular client device. As a result, a comprehensive log file associated with each client device is produced by the log file server. Such a comprehensive log file contains a record of user/client device activities that potentially dates back to the initial registration of the client device with the data backup service. However, the size of the comprehensive log file also grows with time, as the client device remains a subscriber to the backup service.

In step 1450, the comprehensive log files may be compressed in order to facilitate the storage and management (e.g., movement, copying, etc.) of the comprehensive log files. The compression may be carried out in accordance with a lossless compression algorithm, such as the Microsoft Windows compression algorithm. Although compressing the files conserves storage space, it also makes it more computationally expensive to access the contents of the compressed log files. In particular, a compressed file must be decompressed to access to the contents, and compressed again prior to its storage. According to an embodiment, in order to mitigate the computational expense associated with the decompression/compression operations, a comprehensive log file is only partially compressed.

Figure 15:
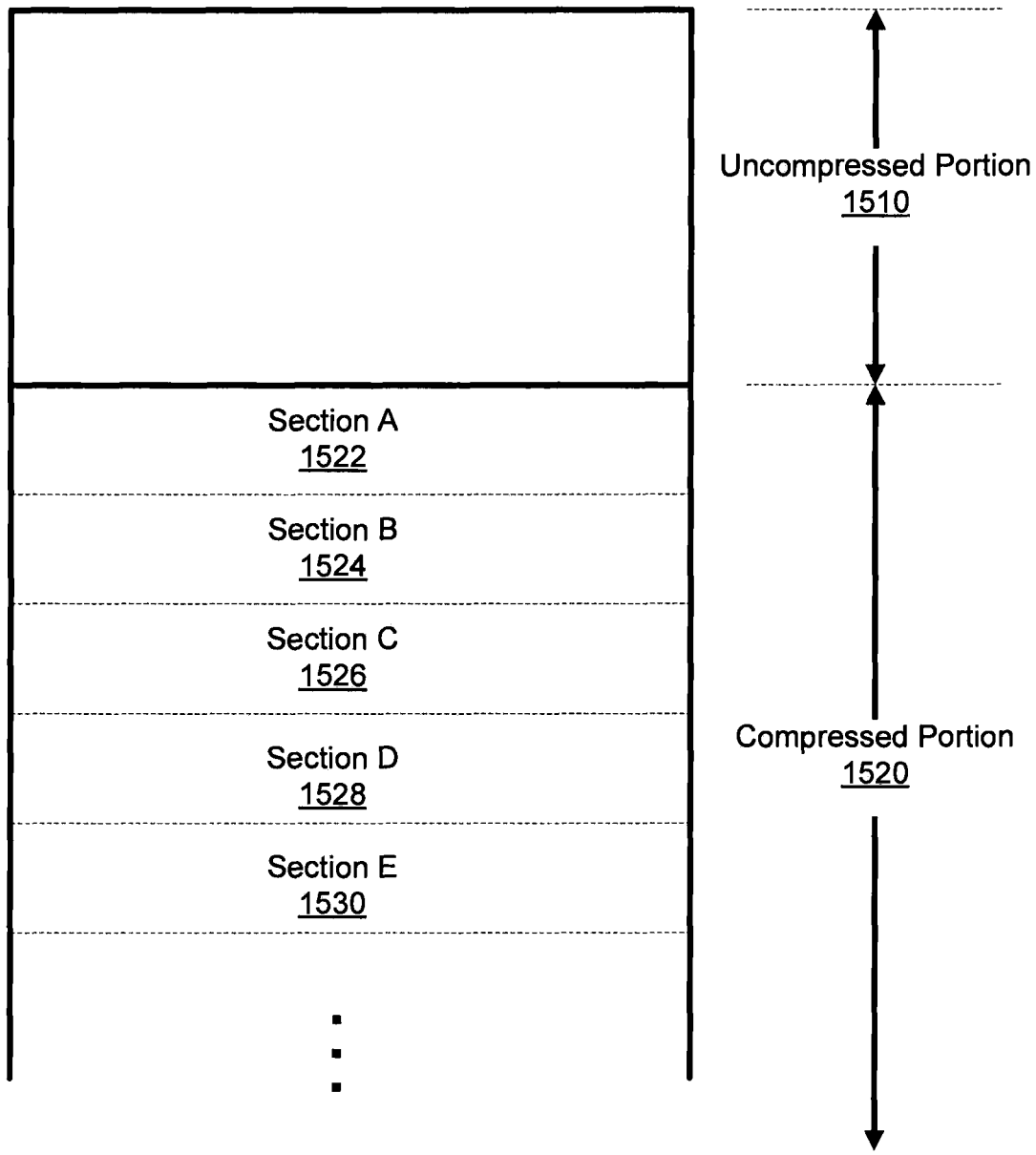
FIG. 15 is an exemplary representation of a partially compressed comprehensive log file, according to one exemplary embodiment.

FIG. 15 illustrates a partially compressed comprehensive log file 1500 associated with a client device that is produced according to the disclosed embodiments. The partially compressed comprehensive log file 1500 includes an uncompressed portion 1510 and a compressed portion 1520. The uncompressed portion 1510 includes the most recent log files associated with a client device, whereas the compressed portion 1520 contains older log files. As aggregated log files are received, the newly received aggregated log files, after decryption and decompression, are appended to the uncompressed portion 1510. In one example, the most recent log file resides at the very top section of the uncompressed portion 1510. In one embodiment, a maximum limit is imposed on the size of the uncompressed portion 1510. For example, the uncompressed portion 1510 may only allowed to grow as large as 64 Mega Bytes. Once this size limit is reached, at least a segment of the uncompressed portion 1510 is compressed. For example, when the size of the uncompressed portion reaches the maximum limit of 64 Mega Bytes, a segment (e.g., one half) of the uncompressed content may be compressed. This way, at any given time, at least a portion of the comprehensive log file is in uncompressed format to facilitate the search and analysis of most recent client device activities. Alternatively, when the size of the uncompressed portion reaches the maximum limit, the entire uncompressed portion 1510 may be compressed.

In another embodiment, the compression of the uncompressed portion 1510 may be carried out according to a schedule. For example, the uncompressed portion 1510 may be compressed at least once every two weeks, even if the uncompressed portion 1510 has not reached its size limit. FIG. 15 illustrates the compressed portion 1520 that includes a plurality of sections, labeled as section A 1522, section B 1524, section C 1526, section DB 1528 and section E 1530. These sections correspond to the segments of the uncompressed portion 1510 that have been compressed over time. For example, section A 1522 may represent a more recent section of the comprehensive log file than section B 1524. A partially compressed comprehensive log file 1500 that is produced in accordance with the disclosed embodiments reduces the storage requirement associated with the comprehensive log file, while, at the same time, reducing computational complexity associated with searching, appending and managing the comprehensive log files. It should be noted that the contents of the partially compressed comprehensive file 1500 may be reside in a single file or in multiple files. For example, the uncompressed portion 1510 and the compressed portion 1520 may reside in two separate files.

As noted earlier, the data center may receive a large number of data and log files that are associated with various client devices. Management and access to these files are further complicated due to the bursty nature of the incoming files. For example, the number of files may reach or exceed several million files on a given day. When the incoming traffic exceeds a certain limit, some servers turn off their background processing operations to free computational resources to handle the incoming files. The disclosed embodiments facilitate the management of the incoming log files by providing one or more dedicated log file servers to manage and analyze the receive log files. The log file server can be used to manage the incoming log files and to further analyze and search the existing log files.

Figure 16:
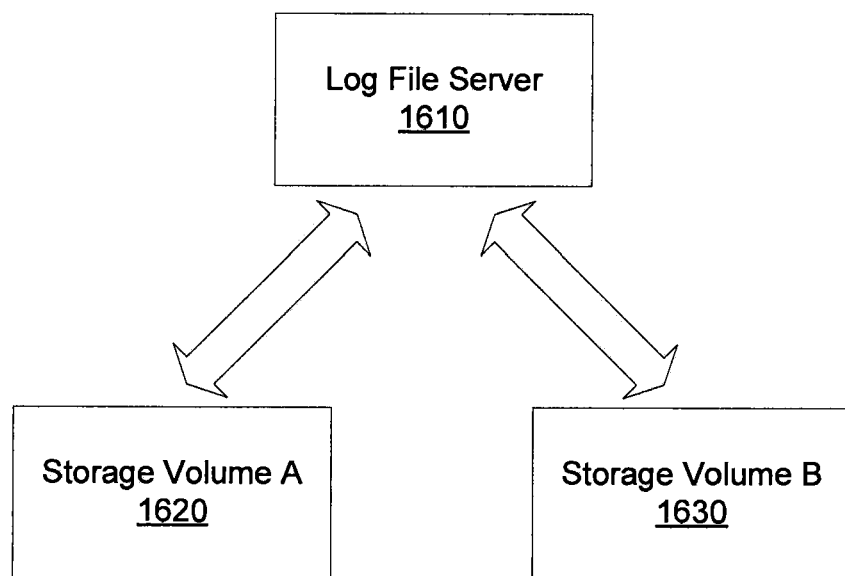
FIG. 16 is a block diagram illustrating an exemplary log file server and the associated storage volumes, according to one exemplary embodiment.

A log file server, and in particular, the log file management module 1120 in a log file server, may also perform maintenance operations on the existing log files. FIG. 16 illustrates a block diagram of a log file server 1610 that is in communication with a storage volume A 1620 and a storage volume B 1630. Storage volume A 1620 and storage volume B 1630 may be logical storage volumes, storage devices, distributed storage devices and the like. At any given time, the number of files (both data files and log files) may exceed the number of client devices with a valid subscription to the backup service. For example, from approximately 1 million customer identification codes associated with various stored files, about one-half may correspond to clients that are no longer subscribed to the service. According to the disclosed embodiments, the log file server 1610 periodically analyzes the existing comprehensive log files to remove the log files that are associated with clients with expired subscriptions under certain conditions. For example, the file management module 1120 may delete all log files associated with a client device six month after the expiration of the client's subscription to the data backup service. The log file server 1610 may also organize the existing log files such that, for example, storage volume A 1620 contains the more recent log files, whereas storage volume B 1630 contains the older log files. In one example, a comprehensive log file may be partitioned into two or more segments, with the older segment residing at storage device A 1620 and the more recent version residing in storage volume B 1630.

A comprehensive log file can be used to determine the cause and timing of a particular problem associated with a client data. To facilitate access and search of the comprehensive log files, the log file server (e.g., the file management module 1120 within the log file server) is further configured to index the stored comprehensive log files and to generate a map of the stored log files. The map can be used to quickly locate and access the contents of the log files. For example, a customer support specialist can access the log files through a web interface to zero in on a particular log file entry to answer a customer inquiry. In addition, with the aid of the status files, particular backup data files associated with the log files can be readily located and accessed, if needed.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The communication networks can include, for example, packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium. Computer-readable media can be non-transitory in nature and cab include both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method comprising:
  receiving, by a file service module of a storage server, log files from a client device that is in communication with the storage server over a communications network, wherein the log files comprise records of activities associated with the client device;
  aggregating, by the file service module, the log files to produce an aggregated log file, wherein the aggregated log file includes compressed log files and uncompressed log files, and wherein the uncompressed log files are more recent log files than the compressed log files; and
  transmitting, by the file service module to a log file server, the aggregated log file responsive to a size of the aggregated log file being equal to at least a set size limit, wherein the set size limit for the aggregated log file is dynamically modified to control a frequency of the transmitting of the aggregated log file to the log file server to obtain a desired performance target.

2. The method of claim 1, further comprising filtering ones of the log files from the aggregated log file by excluding ones of the log files that have a size or a frequency of reception that exceed thresholds.

3. The method of claim 1, wherein the receiving comprises receiving the log files from a plurality of client devices, and wherein the aggregating comprises associating the log files with particular ones of the plurality of client devices to produce a particular aggregated log file for each of the plurality of client devices.

4. The method of claim 1, wherein different ones of the log files have different sizes.

5. The method of claim 1, wherein the log files are received periodically by the file service module.

6. The method of claim 1, wherein the log files received by the file service module comprise encrypted files.

7. A method comprising:
- receiving, by a file service module of a storage server, transmitted log files from a client device that is in communication with the storage server over a communications network, wherein the transmitted log files comprise records of activities associated with the client device;
- aggregating, by the file service module, the transmitted log files to produce an aggregated log file, wherein the aggregating comprises compressing ones of the transmitted log files, and wherein the aggregated log file is partially compressed and comprises compressed log files and uncompressed log files, wherein the compressed log files in the aggregated log file are ones of the transmitted log files that were received by the file service module relatively earlier than the uncompressed log files; and
- transmitting, by the file service module to a log file server, the aggregated log file responsive to a size of the aggregated log file being equal to at least a set size limit, wherein the set size limit for the aggregated log file is dynamically modified to control a frequency of the transmitting of the aggregated log file to the log file server to obtain a desired performance target.

8. The method of claim 7, further comprising filtering ones of the transmitted log files from the aggregated log file by excluding ones of the transmitted log files that have a size or a frequency of reception that exceed thresholds.

9. The method of claim 7, wherein the receiving comprises receiving the transmitted log files from a plurality of client devices, and wherein the aggregating comprises associating the transmitted log files with particular ones of the plurality of client devices to produce a particular aggregated log file for each of the plurality of client devices.

10. The method of claim 7, wherein different ones of the transmitted log files have different sizes.

11. The method of claim 7, wherein the transmitted log files are received periodically by the file service module.

12. The method of claim 7, wherein the transmitted log files received by the file service module comprise encrypted files.

13. A storage server, comprising:
- a processor; and
- a memory comprising processor executable code, wherein the processor executable code, when executed by the processor, configures the storage server to:
  - receive log files from a client device that is in communication with the storage server over a communications network, wherein the log files comprise records of activities associated with the client device;
  - aggregate the log files to produce an aggregated log file, wherein the aggregated log file includes compressed log files and uncompressed log files, and wherein the uncompressed log files are more recent log files than the compressed log files; and
  - transmit the aggregated log file to a log file server responsive to a size of the aggregated log file being equal to at least a set size limit, wherein the set size limit for the aggregated log file is dynamically modified to control a frequency of transmitting the aggregated log file to the log file server to obtain a desired performance target.

14. The storage server of claim 13, wherein the processor executable code, when executed by the processor, configures the storage server to filter ones of the log files from the aggregated log file by excluding ones of the log files that have a size or a frequency of reception that exceed thresholds.

15. The storage server of claim 13, wherein the log files are received from a plurality of client devices, and wherein aggregation of the log files comprises associating the log files with particular ones of the plurality of client devices to produce a particular aggregated log file for each of the plurality of client devices.

16. The storage server of claim 13, wherein different ones of the log files have different sizes.

17. The storage server of claim 13, wherein the log files are received periodically by the storage server.

* * * * *